(12) United States Patent
Jibiki et al.

(10) Patent No.: US 8,936,400 B2
(45) Date of Patent: *Jan. 20, 2015

(54) OPTICAL CONNECTOR ADAPTER WITH SHUTTER

(71) Applicant: Seikoh Giken Co., Ltd., Chiba (JP)

(72) Inventors: Masayuki Jibiki, Chiba (JP); Junji Taira, Chiba (JP)

(73) Assignee: Seikoh Giken Co., Ltd., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,859

(22) Filed: Jan. 28, 2014

(65) Prior Publication Data

US 2014/0140661 A1 May 22, 2014

Related U.S. Application Data

(63) Continuation of application No. 13/191,520, filed on Jul. 27, 2011, now Pat. No. 8,794,851.

(30) Foreign Application Priority Data

Jul. 30, 2010 (JP) ................................. 2010-171315

(51) Int. Cl.
*G02B 6/38* (2006.01)
(52) U.S. Cl.
CPC ............ *G02B 6/3874* (2013.01); *G02B 6/3825* (2013.01); *G02B 6/3849* (2013.01)
USPC ................................. 385/75; 385/72; 385/78

(58) Field of Classification Search
None
See application file for complete search history.

(56) References Cited

U.S. PATENT DOCUMENTS

| | | | |
|---|---|---|---|
| 6,461,054 B1* | 10/2002 | Iwase | 385/73 |
| 7,340,146 B2* | 3/2008 | Lampert et al. | 385/139 |
| 7,507,032 B2* | 3/2009 | Katagiyama et al. | 385/73 |
| 7,837,395 B2* | 11/2010 | Lin et al. | 385/58 |
| 2007/0230874 A1* | 10/2007 | Lin | 385/53 |

FOREIGN PATENT DOCUMENTS

| | | |
|---|---|---|
| DE | 4229511 | 3/1994 |
| JP | 2008-020567 | 1/2008 |

* cited by examiner

*Primary Examiner* — Michelle R Connelly
(74) *Attorney, Agent, or Firm* — Clark & Brody

(57) ABSTRACT

A shutter member of the optical communication adapter includes a base plate, both side plates, a connecting plate, and an elastically deformable shutter plate having a predetermined curvature radius. In the adapter, the base plate of the shutter member is fitted into a bottom recess formed on an external surface of a bottom wall and the both side plates of the shutter member are fitted into both side recesses formed on the external surface of both sidewalls. The shutter plate of the shutter member is positioned at both open ends of an insertion hole to shield the insertion hole while being curved to form a convex shape toward a center portion of the insertion hole and, when a connector is inserted into the insertion hole, falls toward the center portion of the insertion hole by being pressed by the connector.

6 Claims, 20 Drawing Sheets

OPTICAL CONNECTOR ADAPTER WITH SHUTTER

This application is a continuation of U.S. application Ser. No. 13/191,520, filed on Jul. 27, 2011, which claims priority of JP 2010-171315, filed on Jul. 30, 2010.

BACKGROUND OF THE INVENTION

1. Field of the Invention

The present invention relates to an optical connector adapter that connects optical connector plugs or an optical connector plug and an optical oscillating apparatus such as a semiconductor laser.

2. Description of the Related Art

In optical communication in which laser light oscillated from an optical oscillating apparatus such as a semiconductor laser is transmitted by using an optical fiber, an optical connector adapter that allows an optical connector plug to be removably inserted is used as a unit for connecting the optical fiber. If removal work of the optical connector plug inserted into the adapter is done while laser light being oscillated from the optical oscillating apparatus, there is a danger that eyes of an operator may be exposed to laser light leaked out from the adapter.

To avoid such a danger, an optical connector adapter including a housing formed of top/bottom walls and both sidewalls, an insertion hole cutting through the housing in a front-back direction through which an optical connector plug is removably inserted, an optical connection sleeve installed in a center portion of the insertion hole to support a ferrule of the optical connector plug, and a shutter metal fitting capable of opening/closing the insertion hole (see Japanese Patent Application Laid-Open No. 2008-20567 (JP. A)).

The shutter metal fitting is formed of a hollow fitting plate whose sectional shape is prismatic and an elastically deformable shutter plate connected to a front edge of the fitting plate. The fitting plate is fixed to the housing via an engaging piece or a stopper while surrounding external surfaces of the top/bottom walls and both sidewalls of the housing. The shutter plate is positioned on the inner side of an end of the insertion hole to shield the insertion hole while inclining toward the center portion of the insertion hole. If an optical connector plug is inserted into the insertion hole of the adapter, the shutter plate is elastically deformed by being pressed by the optical connector plug and the shutter plate falls toward the center portion of the insertion hole so that shielding of the insertion hole is released. When the optical connector plug is removed from the insertion hole, the shutter plate rises owing to an elastic force (repulsive force) thereof to shield the insertion hole again.

In an optical connector adapter disclosed by Japanese Patent Application Laid-Open No. 2008-20567 (JP. A), the fitting plate of the shutter metal fitting is fixed to the adapter while surrounding external surfaces of the top/bottom walls and both sidewalls of the adapter and thus, the adapter with the shutter metal fitting attached may become larger than the standard outside dimensions. While the shutter metal fitting used for the adapter is produced by press molding, the number of parts such as the engaging piece and the stopper is large and the level of difficulty of press molding is high to increase the accuracy of such parts. Further, after the shutter metal fitting is created by press molding, it is necessary to assemble into a hollow prismatic shape and thus, not only efforts and time for the assembly, but also production costs of the shutter metal fitting are needed and, as a result, unit costs of the adapter itself rise.

An object of the present invention is to provide an optical connector adapter having a fewer number of parts and a shutter member whose production is easy and for which standard outside dimensions can be adopted. Another object of the present invention is to provide an optical connector adapter having a shutter member whose mounting on the adapter is easy and which requires no effort and time for mounting and can be produced at low unit costs.

SUMMARY OF THE INVENTION

An assumption of the present invention to solve the above problem is an optical connector adapter having top/bottom walls and both sidewalls extending in a front-back direction, an insertion hole surrounded by these walls and cutting through in the front-back direction to allow an optical connector plug to be removably inserted, a sleeve for optical connection installed in a center portion of the insertion hole to support a ferrule of the optical connector plug, and a shutter member capable of opening/closing an end of the insertion hole.

According to an aspect of the present invention under the above assumption, the shutter member includes a base plate, both side plates extending upward from both side edges of the base plate, a connecting plate positioned between the both side plates and extending upward from a front edge of the base plate, and an elastically deformable shutter plate connected to the connecting plate, extending upward from the base plate, and curved with a predetermined curvature radius and the base plate of the shutter member is fitted into a bottom recess formed on an external surface of a bottom wall of the adapter and recessed toward an internal surface of the bottom wall, the both side plates of the shutter member are fitted into both side recesses formed on the external surface of the both sidewalls of the adapter and recessed toward the internal surface of the both sidewalls, and the shutter plate of the shutter member is positioned at the end of the insertion hole to shield the insertion hole while being curved to form a convex shape toward the center portion of the insertion hole and when the optical connector plug is inserted into the insertion hole, falls toward the center portion of the insertion hole by being pressed by the optical connector plug.

As an example of the present invention, the connecting plate of the shutter member is fitted into an end face recess formed on a bottom wall end face of the adapter and recessed toward the center portion of the insertion hole, the base plate of the shutter member is formed in substantially the same shape and size as that of a bottom recess formed on the external surface of the bottom wall to be in close contact with the whole bottom recess, and the both side plates of the shutter member are formed in substantially the same shape and size as that of both side recesses formed on the external surface of the both sidewalls to be in close contact with the whole both side recesses.

As another example of the present invention, the bottom recess formed on the external surface of the bottom wall includes a first recess positioned on one of a front side and rear side in the front-back direction, a second recess positioned on the other of the front side and the rear side in the front-back direction and having a depth dimension deeper than the depth dimension of the first recess, and a step portion connected to the first recess and the second recess and the base plate of the shutter member includes a first fitting portion fitted into the first recess, a second fitting portion fitted into the second recess, and a step fitting portion positioned between the first fitting portion and the second fitting portion and fitted into the step portion.

As still another example of the present invention, an accommodation recess that is recessed toward the external surface of the bottom wall and accommodates the shutter plate of the shutter member when the shutter plate falls toward the center portion of the insertion hole is formed on the internal surface of the bottom wall of the adapter.

As still another example of the present invention, the shutter plate of the shutter member includes a fixed portion positioned at a base end and in close contact with the internal surface of the bottom wall, a bent portion positioned at an extending end thereof and bent at a predetermined angle with respect to the center portion of the insertion hole, and a curved portion positioned between the fixed portion and the bent portion and curved to form a convex shape toward the center portion of the insertion hole.

As still another example of the present invention, the adapter contains at least one partition wall positioned between the both sidewalls and extending in the front-back direction and includes at least the two insertion holes arranged in a lateral direction across the partition wall, the shutter member includes at least the two connecting plates and the two shutter plates arranged in the lateral direction while sharing the base plate, and these shutter plates are positioned at the end of these insertion holes and curved to form the convex shape toward the center portion of the insertion holes.

As still another example of the present invention, the base plate of the shutter member includes a recess positioned between these shutter plates and recessed toward the center portion of the insertion hole.

As still another example of the present invention, the shutter plate has the curvature radius in a range of 5.0 to 7.5 mm.

As still another example of the present invention, the shutter member has a thickness dimension in a range of 0.01 to 0.1 mm and an elastic/repulsive force in a range of 0.1 to 0.6 N.

According to an optical connector adapter according to the present invention, a shutter member is formed of a base plate, both side plates extending upward from both side edges of the base plate, a connecting plate extending upward from a front edge of the base plate, and a shutter plate connected to the connecting plate and curved with a predetermined curvature radius. Thus, the number of parts of the shutter member is small and even when the shutter member is produced by press molding, the level of difficulty of processing is low so that the shutter member in the same shape and size can be mass-produced in a short time by press molding. The shutter member can be produced at low production costs and therefore, the adapter itself can be produced at low unit costs. The shutter member can easily be mounted on the adapter by fitting the base plate of the shutter member into a bottom recess formed on an external surface of a bottom wall of the adapter and fitting the both side plates of the shutter member into both side recesses formed on the external surface of both sidewalls of the adapter and therefore, mounting of the shutter member on the adapter is easy and the adapter can be assembled without much expense in time and effort and, as a result, the adapter itself can be produced at low unit costs. When the shutter member is mounted on the adapter, outside dimensions of the adapter do not become too large so that the adapter can be contained within the standard outside dimensions. If an optical connector plug is inserted through an end of an insertion hole of the adapter, the shutter plate of the shutter member falls toward a center portion of the insertion hole by being pressed by the optical connector plug and therefore, shielding by the shutter plate can be released and an optical signal can be connected. If the optical connector plug is extracted from the insertion hole, the shutter plate rises owing to an elastic force thereof to shield the insertion hole again so that leakage of laser light from the adapter can reliably be prevented.

In an optical connector adapter in which the connecting plate of the shutter member is fitted into an end face recess formed on a bottom wall end face of the adapter, the base plate of the shutter member is in close contact with a bottom recess formed on the external surface of the bottom wall, and the both side plates of the shutter member are in close contact with both side recesses formed on the external surface of the both sidewalls, the shutter member is reliably fixed to the adapter by the connecting plate of the shutter member fitted into the end face recess, the base plate of the shutter member in close contact with the bottom recess, and the both side plates of the shutter member in close contact with the both side recesses and therefore, shifts of the shutter member and detachment of the shutter member from the adapter can be prevented so that the insertion hole can reliably be shielded by using the shutter member.

In an optical connector adapter in which the bottom recess formed on the external surface of the bottom wall includes a first recess, a second recess having a depth dimension deeper than the depth dimension of the first recess, and a step portion connected to these recesses and the base plate of the shutter member includes a first fitting portion fitted into the first recess, a second fitting portion fitted into the second recess, and a step fitting portion fitted into the step portion, the first fitting portion of the base plate is fitted into the first recess, the second fitting portion of the base plate is fitted into the second recess, and the step fitting portion of the base plate is fitted into the step portion. Therefore, the shutter member is reliably fixed to the adapter so that shifts of the shutter member and detachment of the shutter member from the adapter can be prevented and the insertion hole can reliably be shielded by using the shutter member. The step fitting portion formed on the base plate of the shutter member functions as a rib and therefore, torsion and bending of the base plate can be prevented and the base plate can reliably be brought into close contact with the bottom recess. Therefore, the shutter member can reliably be fixed to the adapter.

In an optical connector adapter in which an accommodation recess that accommodates the shutter plate of the shutter member when the shutter plate falls toward the center portion of the insertion hole is formed on the internal surface of the bottom wall, the shutter plate is successively accommodated in the accommodation recess in the process in which the shutter plate falls. Therefore, the optical connector plug can smoothly be inserted into the insertion hole and the optical connector plug can smoothly be extracted from the insertion hole without the insertion or extraction of the optical connector plug through ends being hindered by the shutter plate.

In an optical connector adapter in which the shutter plate of the shutter member includes a fixed portion in close contact with the internal surface of the bottom wall, a bent portion bent at a predetermined angle, and a curved portion curved to form a convex shape toward the center portion of the insertion hole, the internal and external surfaces of the bottom wall of the adapter are sandwiched between the base plate and the fixed portion of the shutter plate and therefore, the shutter member is reliably be fixed to the adapter. As a result, shifts of the shutter member and detachment of the shutter member from the adapter can be prevented and the insertion hole can reliably be shielded by using the shutter member. The bent portion of the shutter plate of the shutter member is bent at a predetermined angle toward the center portion of the insertion hole. Thus, when the optical connector plug is inserted through the end of the insertion hole, an edge of an extending end of the shutter plate does not come into contact with the optical connector plug so that damage of the optical connector plug caused by contact of the edge of the extending end of the shutter plate with the optical connector plug can be prevented. The curved portion positioned between the fixed portion and the bent portion of the shutter plate is curved to form a convex shape toward the center portion of the insertion hole and therefore, durability of the shutter plate is improved with the uniform distribution of elastic force (repulsive force) of the shutter plate by the curved portion. Even if the shutter plate repeatedly falls and rises, the elastic force of the shutter plate does not deteriorate and the insertion hole can reliably be shielded by using the shutter plate in repeated uses.

In an optical connector adapter in which the adapter contains at least one partition wall positioned between the both sidewalls and includes at least two insertion holes arranged in a lateral direction across the partition wall and the shutter member includes at least two connecting plates and two shutter plates arranged in the lateral direction while sharing the base plate, at least two optical connector plugs for optical fiber connection can be inserted through ends of the insertion holes while being arranged in the lateral direction to connect light via these optical connector plugs so that optical connections by a plurality of paths can be established at a time. The shutter member is formed of the base plate, the both side plates extending upward from both side edges of the base plate, at least two connecting plates, and at least two shutter plates connected to the connecting plates and curved with a predetermined curvature radius. Thus, the number of parts of the shutter member is small and even when the shutter member is produced by press molding, the level of difficulty of processing is low so that the shutter member in the same shape and size can be mass-produced in a short time by press molding. The shutter member can be produced at low production costs and, as a result, the adapter itself can be produced at low unit costs. The shutter member can easily be mounted on the adapter by fitting the base plate of the shutter member into the bottom recess formed on the external surface of the bottom wall of the adapter and fitting the both side plates of the shutter member into the both side recesses formed on the external surface of the both sidewalls of the adapter and therefore, mounting of the shutter member on the adapter is easy and the adapter can be assembled without much expense in time and effort and, as a result, the adapter itself can be produced at low unit costs. When the shutter member is mounted on the adapter, outside dimensions of the adapter do not become too large so that the adapter can be contained within the standard outside dimensions. If optical connector plugs for optical fiber connection are inserted through ends of these insertion holes of the adapter, the shutter plates of the shutter members fall toward the center portion of the insertion hole by being pressed by the optical connector plug and therefore, shielding by the shutter plates can be released and an optical signal can be connected. If the optical connector plugs are extracted from ends of the insertion holes, the shutter plates rise owing to an elastic force (repulsive force) thereof to shield the insertion holes again so that leakage of laser light from the adapter can reliably be prevented.

In an optical connector adapter in which the base plate of the shutter member includes a recess positioned between these shutter plates and recessed toward the center portion of the insertion hole, even if one of the shutter plates of the shutter members falls against the elastic force thereof owing to the insertion of the optical connector plug, the force of falling of the one shutter plate is not transmitted to the other shutter plate arranged in the lateral direction thanks to the recess. Therefore, even if one of the shutter plates falls, the other shutter plate will not fall following the one shutter plate so that the other insertion hole can reliably be shielded by the other shutter plate.

In an optical connector adapter in which the curvature radius of the shutter plate is in the range of 5.0 to 7.5 mm, the curvature radius of the shutter plate is in the above range. Therefore, when the optical connector plug is inserted into the insertion hole, the shutter plate does not come into contact with a ferrule of the optical connector plug so that damage of the ferrule caused by contact of the shutter plate with the ferrule of the optical connector plug can be prevented. The shutter plate is curved with the curvature radius toward the center portion of the insertion hole and therefore, durability of the shutter plate is improved with the uniform distribution of elastic force (repulsive force) of the shutter plate. Even if the shutter plate repeatedly falls and rises, the elastic force of the shutter plate does not deteriorate and the insertion hole can reliably be shielded by using the shutter plate in repeated uses.

In an optical connector adapter in which the thickness dimension of the shutter plate is in the range of 0.01 to 0.1 mm and the elastic/repulsive force of the shutter plate is in the range of 0.1 to 0.6N, the thickness dimension of the shutter plate is in the above range and therefore, the shutter member of the same shape and size can be mass-produced in a short time by press molding so that the shutter member can be produced at low production costs and. As a result, the adapter itself can be produced at low unit costs. The elastic/repulsive force of the shutter plate is in the above range and thus, when the optical connector plug is inserted through the end of the insertion hole, the shutter plate of the shutter member reliably falls toward the center portion of the insertion hole and therefore, shielding by the shutter plate can reliably be released. When the optical connector plug is extracted from the insertion hole, the shutter plate reliably rises due to the elastic force thereof and thus, the insertion hole can reliably be shielded.

DETAILED DESCRIPTION OF THE EMBODIMENT

Figure 1:
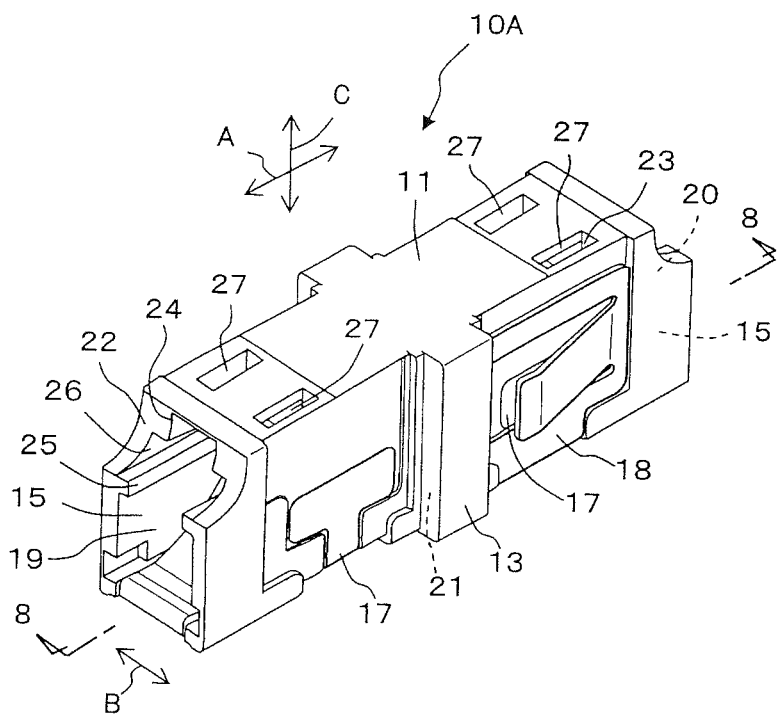
FIG. 1 is a perspective view of an optical connector adapter shown as an example.
Figure 2:
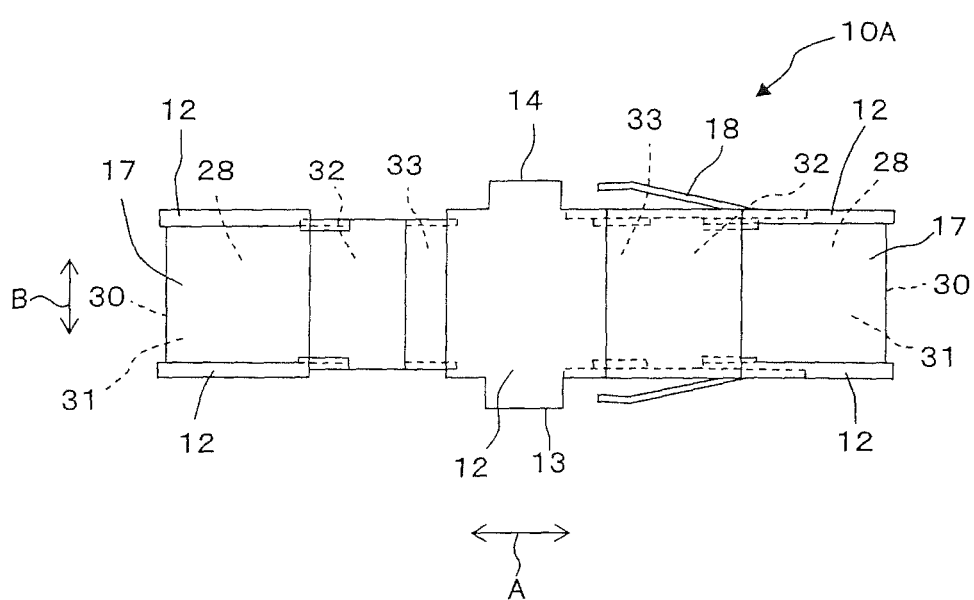
FIG. 2 is a bottom view showing a bottom wall of the adapter.
Figure 3:
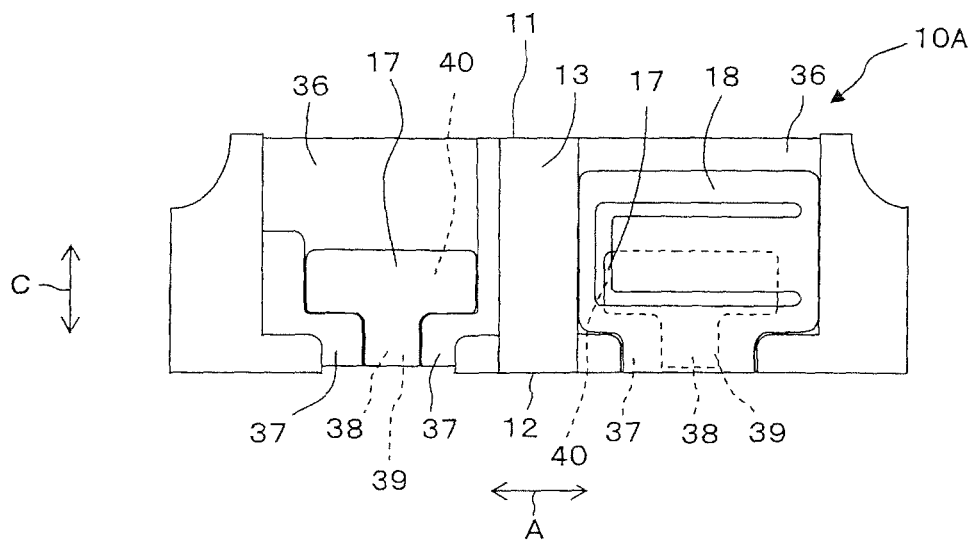
FIG. 3 is a side view showing a sidewall of the adapter.
Figure 4:
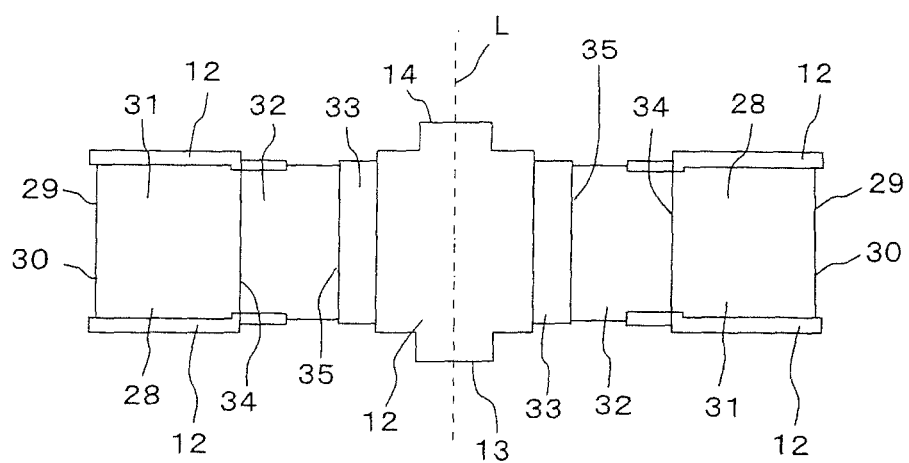
FIG. 4 is a bottom view showing the bottom wall of the adapter before a shutter member and a stopper member are mounted.
Figure 5:
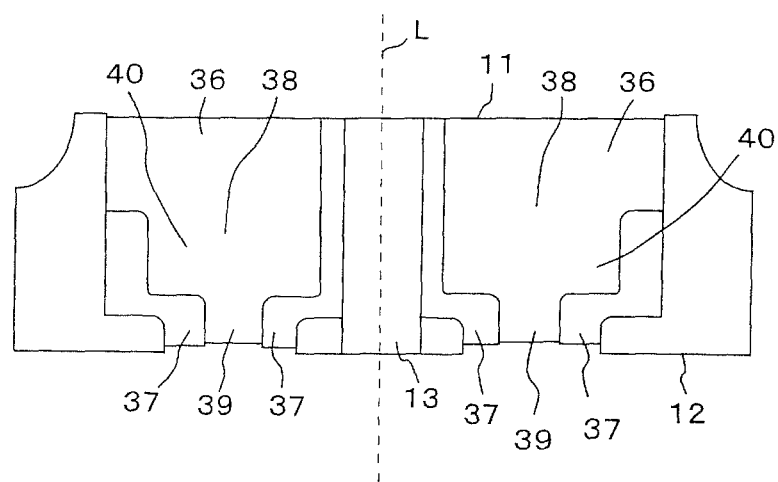
FIG. 5 is a side view showing the sidewall of the adapter before the shutter member and the stopper member are mounted.
Figure 6:
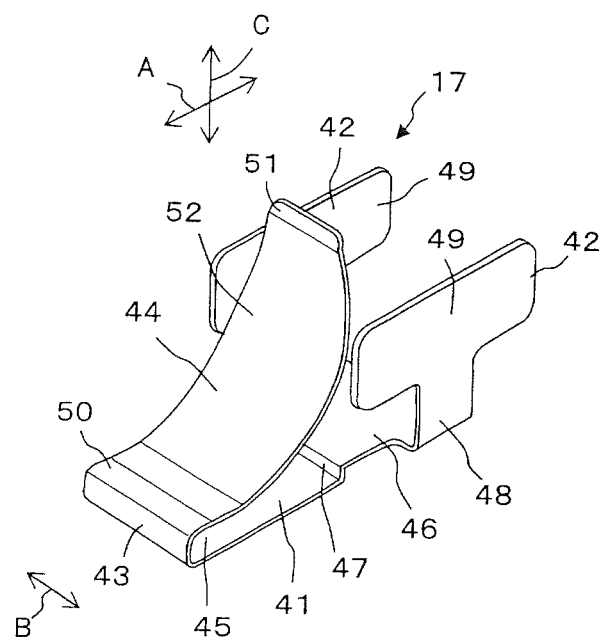
FIG. 6 is a perspective view of the shutter member shown as an example.
Figure 7:
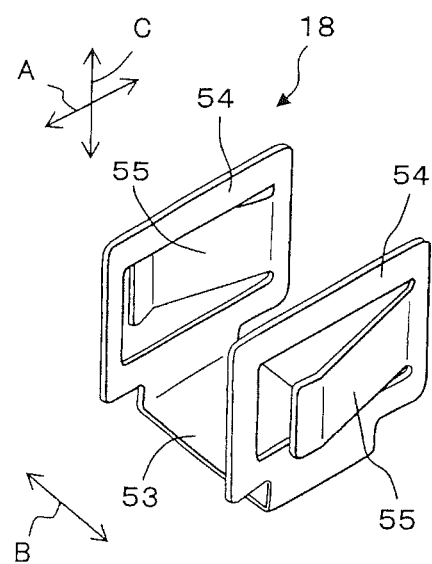
FIG. 7 is a perspective view of the stopper member shown as an example.
Figure 8:
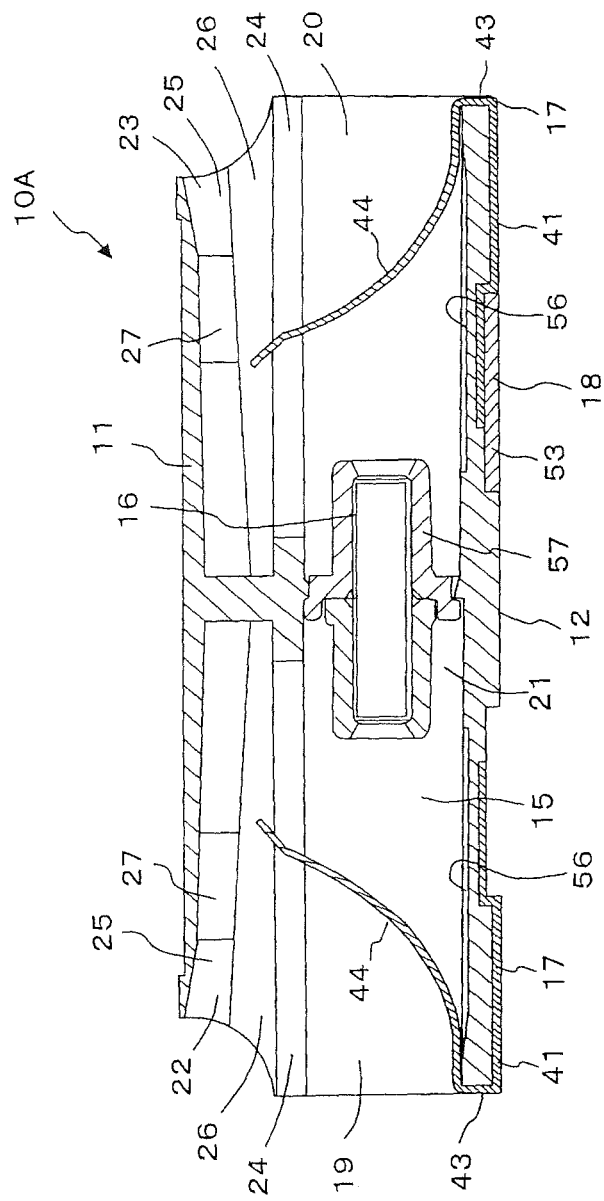
FIG. 8 is a sectional view on an 8-8 line arrow of FIG. 1.

Details of an optical connector adapter according to the present invention will be described as shown below with reference to appended drawings such as FIG. 1 as a perspective view of an optical connector adapter shown as an example. FIG. 2 is a bottom view showing a bottom wall 12 of an adapter 10A and FIG. 3 is a side view showing a sidewall 13 of the adapter 10A. FIG. 4 is a bottom view showing the bottom wall 12 of the adapter 10A before a shutter member 17 (shielding metal fitting) and a stopper member 18 (locking metal fitting) are mounted and FIG. 5 is a side view showing the sidewall 13 of the adapter 10A before the shutter member 17 and the stopper member 18 are mounted. FIG. 6 is a perspective view of the shutter member 17 shown as an example and FIG. 7 is a perspective view of the stopper member 18 shown as an example. FIG. 8 is a sectional view on an 8-8 line arrow of FIG. 1. In FIGS. 1 to 3, 6, and 7, the front-back direction is indicated by an arrow A, a lateral direction by an arrow B, and an up-down direction by an arrow C.

In optical communication in which laser light (optical signal) oscillated from an optical oscillating apparatus such as a semiconductor laser is transmitted by using an optical fiber, the optical connector adapter 10A is used as a connection unit to connect the optical fiber. The adapter 10A is a housing made of synthetic resin or metal such as zinc die casting and the shape thereof is formed symmetrically by sandwiching a center line L indicated by alternate short and long dashed lines in FIGS. 4, 5 therebetween (the shape thereof is in a mirror image relationship).

The adapter 10A includes top/bottom walls 11, 12 separated and facing each other in the up-down direction and extending in the front-back direction, both sidewalls 13, 14 separated and facing each other in the lateral direction and extending in the front-back direction, an insertion hole 15 surrounded by these walls 11 to 14 and cutting through in the front-back direction, a sleeve holder 57 and a segment sleeve for optical connection 16 installed in the insertion hole 15 (see FIG. 8), the shutter member 17 made of metal (for example, a stainless steel plate for spring), and the stopper member 18 made of metal (for example, a stainless steel plate for spring). The both sidewalls 13, 14 are perpendicular to the top/bottom walls 11, 12 and are connected to these walls 11, 12.

The insertion hole 15 includes a pair of both open ends 19, 20 (ends) separated from and facing each other in the front-back direction and a center portion 21 positioned between the both open ends 19, 20. An optical connector plug 58 described later is removably inserted into the both open ends 19, 20 of the insertion hole 15. The sleeve holder 57 is formed in a hollow cylindrical shape and positioned in the center portion 21 of the insertion hole 15 to extend in the front-back direction. The sleeve holder 57 is formed in a hollow cylindrical shape and is positioned in the center portion 21 of the insertion hole 15 to extend in the front-back direction. The segment sleeve for optical connection 16 is positioned in the center portion 21 of the insertion hole 15 and extends in the front-back direction while being held inside the sleeve holder 57. When the optical connector plug 58 is inserted into the insertion hole 15, the sleeve 16 supports a ferrule 62 in a cylindrical shape exposed from an end of the optical connector plug 58 (see FIG. 10).

Two engaging portions 22, 23 (see FIG. 8) with which an engaging member 61 (see FIGS. 9, 10) of the optical connector plug 58 is removably engaged are formed in the both open ends 19, 20 of the adapter 10A. These engaging portions 22, 23 are formed symmetrically with respect to the both open ends 19, 20 sandwiching the center line L therebetween (the engaging portions 22, 23 are in a mirror image relationship). These engaging portions 22, 23 are formed of a first flange 24 formed in the both sidewalls 13, 14 and extending from the both open ends 19, 20 toward the center portion 21 in the front-back direction, a second flange 25 formed at an intersection of the top wall 11 and the both sidewalls 13, 14 and extending from the both open ends 19, 20 toward the center portion 21 in the front-back direction, a guide groove 26 positioned between these flanges 24, 25 and extending in the front-back direction, and an insertion opening 27 formed in the top wall 11 and into which an insertion protrusion 69 (see FIGS. 9, 10) of the engaging member 61 of the optical connector plug 58 is removably inserted. The second flange 25 is inclined downward in the up-down direction from the both open ends 19, 20 toward the center portion 21.

Two bottom recesses 28 recessed in the up-down direction toward an internal surface of the bottom wall 12 are formed on an external surface of the bottom wall 12 of the adapter 10A. These bottom recesses 28 are formed symmetrically by sandwiching the center line L therebetween (the bottom recesses 28 are in a mirror image relationship). Two accommodation recesses 56 recessed in the up-down direction toward the external surface of the bottom wall 12 are formed on the internal surface of the bottom wall 12 of the adapter 10A. These accommodation recesses 56 are formed symmetrically by sandwiching the center line L therebetween (the accommodation recesses 56 are in a mirror image relationship). These accommodation recesses 56 are recessed in the up-down direction from the internal surface of the bottom wall 12 toward the external surface. These accommodation recesses 56 have a plane shape slightly larger than that of a bent portion 51 and a curved portion 52 described later of the shutter member 17 and so can accommodate the bent portion 51 and the curved portion 52. Two end face recesses 30 recessed toward the center portion 21 of the insertion hole 15 are formed on both end faces 29 (end face) of the bottom wall 12 of the adapter 10A. The end face recesses 30 are formed symmetrically by sandwiching the center line L therebetween (the end face recesses 30 are in a mirror image relationship).

As shown in FIG. 4, the bottom recess 28 includes a substantially rectangular first recess 31 positioned on the side of the both open ends 19, 20 (front side of the front-back direction of the first recess 31) of the insertion hole 15, a substantially rectangular second recess 32 positioned on the side of the center portion 21 (rear side in the front-back direction of the first recess 31), a substantially rectangular third recess 33 positioned on the rear side in the front-back direction of the second recess 32, a step portion 34 connected to the first recess 31 and the second recess 32, and a step portion 35 connected to the second recess 32 and the third recess 33.

In the first recess 31, both edges thereof in the lateral direction are positioned on the inner side of the bottom wall 12 and a step height arises between the both edges of the first recess 31 in the lateral direction and the bottom wall 12 so that the bottom wall 12 becomes a barrier to the first recess 31. The second recess 32 has a depth dimension (recess dimension of the second recess 32 from the external surface of the bottom wall 12 toward the internal surface thereof) deeper than that of the first recess 31 and deeper than that of the third recess 33. The third recess 33 has a depth dimension (recess dimension of the third recess 33 from the external surface of the bottom wall 12 toward the internal surface thereof) deeper than that of the first recess 31 and shallower than that of the second recess 32. A step height arises between the third recess 33 and the bottom wall 12 so that the bottom wall 12 becomes a barrier to the third recess 33. A step height arises between the first recess 31 and the second recess 32 so that the second recess 32 becomes a barrier to the first recess 31 and a step height arises between the third recess 33 and the second recess 32 so that the third recess 33 becomes a barrier to the second recess 32.

Both side recesses 36 recessed in the lateral direction from the external surface of the both sidewalls 13, 14 of the adapter 10A toward the internal surface thereof are formed on the external surface thereof. The both side recesses 36 are formed in the same shape on the one sidewall 13 and on the other sidewall 14 and formed symmetrically across the center line L (the both side recesses 36 are in a mirror image relationship). As shown in FIG. 5, the both side recesses 36 include a fourth recess 37 positioned on the side of the bottom wall 12 and connected to the third recess 33 and a fifth recess 38 positioned on the inner side of the fourth recess 37 and connected to the second recess 32.

The fifth recess 38 has a depth dimension (recess dimension of the fifth recess 38 from the external surface of the both sidewalls 13, 14 toward the internal surface thereof) deeper than that of the fourth recess 37. The fifth recess 38 includes a narrow portion 39 connected to the second recess 32 and whose width dimension in the front-back direction is narrow and a wide portion 40 connected to the narrow portion 39 and whose width dimension in the front-back direction is wider than that of the narrow portion 39. A step height arises between the fourth recess 37 and the both sidewalls 13, 14 so that the both sidewalls 13, 14 become a barrier to the fourth recess 37. A step height arises between the fourth recess 37 and the fifth recess 38 so that fourth recess 37 becomes a barrier to the fifth recess 38.

As shown in FIG. 6, the shutter member 17 includes a substantially rectangular base plate 41, both side plates 42 extending upward from both side edges of the base plate 41, a connecting plate 43 positioned between the both side plates 42 and extending upward from the front edge of the base plate 41, and a shutter plate 44 connected to the connecting plate 43 and extending upward from the base plate 41. The base plate 41 of the shutter member 17 includes a first fitting portion 45 positioned on the front side in the front-back direction (the side of the both open ends 19, 20 of the adapter 10A), a second fitting portion 46 positioned on the rear side in the front-back direction (the side of the center portion 21 of the adapter 10A), and a step fitting portion 47 positioned between the first and second fitting portions 45, 46.

The first fitting portion 45 of the base plate 41 has a plane shape substantially the same as the shape of the first recess 31 of the bottom wall 12 in shape and size and the second fitting portion 46 has a plane shape substantially the same as the shape of the first bottom wall recess 31 in shape and size. The step fitting portion 47 has a plane shape substantially the same as the shape of the step portion 34 of the bottom wall 12 in shape and size. The both side plates 42 of the shutter member 17 have a plane shape substantially the same as the shape of the fifth recess 38 of the both sidewalls 13, 14 in shape and size. The both side plates 42 have a narrow portion 48 connected to the base plate 41 and whose width dimension in the front-back direction is narrow and a wide portion 49 connected to the narrow portion 48 and whose width dimension in the front-back direction is wider than that of the narrow portion 48. The narrow portion 48 has a plane shape substantially the same as that of the narrow portion 39 of the fifth recess 38 in shape and size. The wide portion 49 has a plane shape substantially the same as that of the wide portion 40 of the fifth recess 38 in shape and size.

The shutter plate 44 is elastically deformable with the side of the connecting plate 43 set as the base end. The shutter plate 44 includes a fixed portion 50 positioned at the base end and connected to the connecting plate 43, the bent portion 51 positioned at an extending end thereof, the curved portion 52 positioned between the fixed portion 50 and the bent portion 51. The bent portion 51 is bent at a predetermined angle toward the center portion 21 of the insertion hole 15. The curved portion 52 has a predetermined curvature radius and draws an arc so that the arc is convex toward the center portion 21 of the insertion hole 15.

As shown in FIG. 1, the shutter member 17 is removably fixed to the both open ends 19, 20 of the insertion hole 15. The first fitting portion 45 of the base plate 41 of the shutter member 17 is fitted into the first recess 31 of the bottom wall 12 and is fitted to and in close contact with the whole first recess 31. When the first fitting portion 45 is fitted to the first recess 31, the external surface of the first recess 31 and the external surface of the bottom wall 12 are substantially flush with each other. The second fitting portion 46 of the base plate 41 of the shutter member 17 is fitted into the second recess 32 of the bottom wall 12 and is fitted to and in close contact with the whole second recess 32. When the second fitting portion 46 is fitted to the second recess 32, the external surface of the second fitting portion 46 and the third recess 33 of the bottom wall 12 are substantially flush with each other. The step fitting portion 47 of the base plate 41 of the shutter member 17 is fitted to and in close contact with the first bottom wall step portion 34 of the bottom wall 12.

The both side plates 42 of the shutter member 17 are fitted into the fifth recess 38 of the both sidewalls 13, 14 and are fitted to and in close contact with the fifth recess 38. When the both side plates 42 are fitted to the fifth recess 38, the external surface of the both side plates 42 and the external surface of the fourth recess 37 are flush with each other. The narrow portion 48 of the both side plates 42 is fitted into the narrow portion 39 of the fifth recess 38 and is fitted to and in close contact with the whole portion 39. The wide portion 49 of the both side plates 42 is fitted into the wide portion 40 of the fifth recess 38 and is fitted to and in close contact with the wide portion 40.

The connecting plate 43 of the shutter member 17 is fitted to and in close contact with the end face recess 30 of the bottom wall end face 29. The bent portion 51 and the curved portion 52 of the shutter plate 44 of the shutter member 17 are positioned at the both open ends 19, 20 of the insertion hole 15 to shield the insertion hole 15. In the shutter member 17, the internal and external surfaces of the bottom wall 12 of the adapter 10A are sandwiched between the first fitting portion 45 of the base plate 41 and the fixed portion 50 of the shutter plate 44.

As shown in FIG. 7, the stopper member 18 includes a substantially rectangular base plate 53, both side plates 54 extending upward from both side edges of the base plate 53, and a locking plate 55 formed on the both side plates 54 and extending by being tilted to spread out outward in the lateral direction. The base plate 53 of the stopper member 18 has a plane shape substantially the same as a combined shape of the second recess 32 and the third recess 33 of the bottom wall 12 in shape and size. The both side plates 54 of the stopper member 18 have a plane shape substantially the same as a combined shape of the fourth recess 37 and the fifth recess 38 of the both sidewalls 13, 14 in shape and size.

The stopper member 18 is removably fixed to the one open end 20 (end) of the adapter 10A while being overlaid on the shutter member 17. The base plate 53 of the stopper member 18 is fitted into the third recess 33 of the base plate 12 while being overlaid on the second fitting portion 46 of the base plate 41 of the shutter member 17 and is fitted to and in close contact with the whole third recess 33. When the base plate 53 is fitted to the third recess 33, the external surface of the base plate 53 and the external surface of the bottom wall 12 are substantially flush with each other. The both side plates 54 of the stopper member 18 are fitted into the fourth recess 37 of the both sidewalls 13, 14 while being overlaid on the both side plates 42 of the shutter member 17 and are fitted to and in close contact with the fourth recess 37. When the both side plates 54 are fitted to the fourth recess 37, the external surface of the both side plates 54 and the external surface of the both sidewalls 13, 14 are substantially flush with each other.

Figure 9:
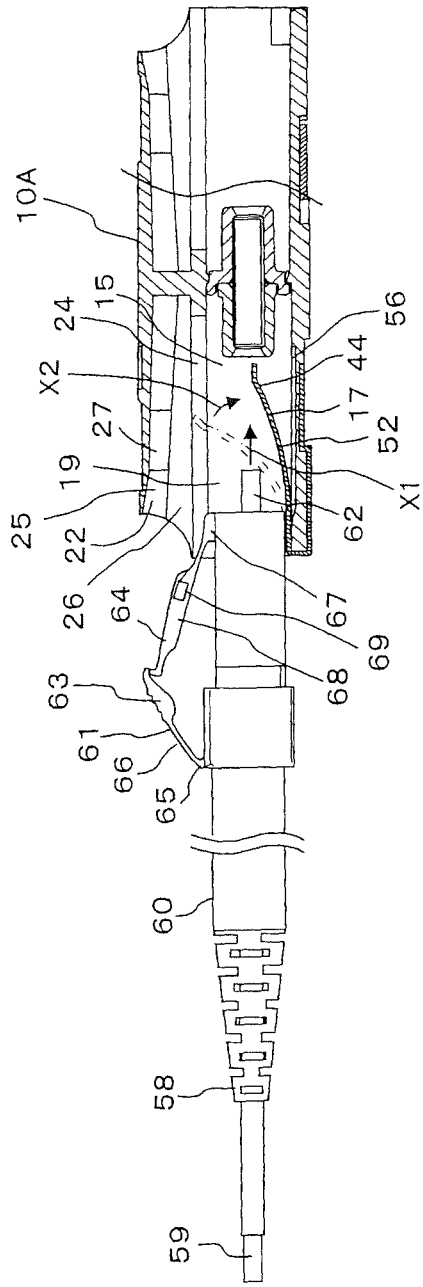
FIG. 9 is, like FIG. 8, a sectional arrow view showing an insertion process of an optical connector plug into an open end of an insertion hole of the optical connector adapter.
Figure 10:
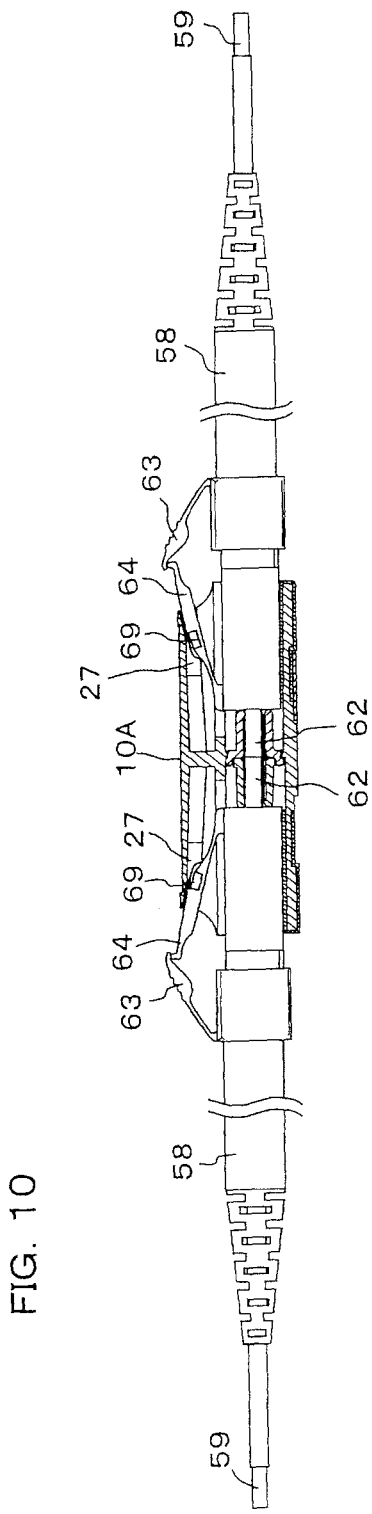
FIG. 10 is, like FIG. 8, a sectional arrow view after the optical connector plug is inserted into both open ends of the insertion hole of the optical connector adapter.

FIG. 9 is, like FIG. 8, a sectional arrow view showing an insertion process of the optical connector plug 58 through the open end 19 of the insertion hole 15 of the optical connector adapter 10A and FIG. 10 is, like FIG. 8, a sectional arrow view after the optical connector plug 58 is inserted through the both open ends 19, 20 of the insertion hole 15 of the optical connector adapter 10A. In FIG. 9, an illustration of the other open end 20 is not shown. Though not illustrated, the adapter 10A is mounted at predetermined positions of a mounting panel, various apparatuses, and various devices used for optical communication by using the locking plate 55 of the stopper member 18.

As shown in FIGS. 9 and 10, the optical connector plug 58 is formed of a sheath member 60 fixing an optical fiber 59 and the engaging member 61 removably engaged with the engaging portions 22, 23 of the adapter 10A. A portion of the ferrule 62 is exposed from the tip of the optical connector plug 58. The sheath member 60 is made of synthetic resin, has flexibility and covers an entire outer circumferential surface of the optical fiber 59. The engaging member 61 includes a picking portion 63 made of synthetic resin and elastically deformable and an engaging portion 64 made of synthetic resin and elastically deformable.

The picking portion 63 includes a base end portion 65 positioned in the center of the sheath member 60 and fixed to the external surface of the sheath member 60 and a free portion 66 inclined upward in the up-down direction base end portion 65 and extending in the front-back direction. The engaging portion 64 includes a base end portion 67 positioned at the front end of the sheath member 60 and fixed to the external surface of the sheath member 60 and a free portion 68 inclined upward in the up-down direction from the base end portion 67 and extending in the front-back direction. The free portion 68 of the engaging portion 64 has a projecting end overlaid below a projecting end of the free portion 66 of the picking portion 63. The free portion 68 of the engaging portion 64 has the insertion protrusion 69 formed in a convex shape outward in the lateral direction on both side thereof.

If the picking portion 63 is pressed down in the up-down direction in the optical connector plug 58, the free portion 66 of the picking portion 63 turns around the base end portion 65 as a pivot downward in the up-down direction and also with the turning of the free portion 66, the free portion 68 of the engaging portion 64 turns around the base end portion 67 as a pivot downward in the up-down direction and the insertion protrusion 69 moves downward in the up-down direction.

While the optical connector plug 58 is not inserted through the both open ends 19, 20 of the insertion hole 15 of the adapter 10A, as shown in FIG. 8, the shutter plate 44 (the bent portion 51 and the curved portion 52) of the shutter member 17 rises upward in the up-down direction to cover the both open ends 19, 20. As shown by an arrow X1 in FIG. 9, if the optical connector plug 58 is pushed through the open end 19 of the insertion hole 15 of the adapter 10A, the sheath member 60 of the optical, connector plug 58 gradually advances through the open end 19 opened below the first flange 24 of the open end 19 and also the engaging portion 64 of the engaging member 61 of the optical connector plug 58 gradually advances into the guide groove 26 between the first and second flanges 24, 25.

If the sheath member 60 advances into the open end 19, the bottom edge of the sheath member 60 touches the curved portion 52 of the shutter plate 44 and presses the curved portion 52 toward the center portion 21 of the insertion hole 15 (presses to the rear side in the front-back direction). As the engaging portion 64 of the engaging member 61 of the optical connector plug 58 gradually advances into the guide groove 26, the engaging portion 64 touches the second flange 25 and slides and the second flange 25 presses the engaging portion 64 downward in the up-down direction.

If the sheath member 60 presses the curved portion 52, as shown by an arrow X2 in FIG. 9, the sheath member 60 elastically deforms the curved portion 52 against the elastic force of the curved portion 52 of the shutter plate 44. While being elastically deformed, the curved portion 52 gradually falls toward the center portion 21 of the insertion hole 15. If the second flange 25 presses the engaging portion 64, the second flange 25 elastically deforms the engaging portion 64 against the elastic force of the engaging portion 64. While being elastically deformed, the free portion 68 of the engaging portion 64 turns around the base end portion 67 as a pivot downward in the up-down direction and the insertion protrusion 69 moves downward in the up-down direction.

If the optical connector plug 58 is further pushed through the open end 19 of the insertion hole 15 of the adapter 10A, the free portion 68 of the engaging portion 64 further turns downward in the up-down direction and when the insertion protrusion 69 of the free portion 68 of the engaging portion 64 comes to the position of the insertion opening 27 of the top wall 11, the free portion 68 of the engaging portion 64 is deformed upward in the up-down direction by the elastic force (repulsive force) thereof and the insertion protrusion 69 of the free portion 68 is inserted into the insertion opening 27 of the top wall 11. If the insertion protrusion 69 is inserted into the insertion opening 27, as shown in FIG. 10, the insertion of the optical connector plug 58 through the both open ends 19, of the insertion hole 15 of the adapter 10A is completed. Then, the bent portion 51 and the curved portion 52 of the shutter plate 44 fall so that the bent portion 15 and the curved portion 52 are accommodated in the accommodation recesses 56. The ferrule 62 exposed from the optical connector plug 58 is also accommodated in the sleeve 16. If the optical connector plug 58 is inserted through the both open ends 19, 20 of the insertion hole 15 of the adapter 10A, the ferrules 62 touch inside the sleeve 16 so that the optical fibers 59 are optically connected.

To remove the optical connector plug 58 from the both open ends 19, 20, the picking portion 63 of the engaging member 61 is pressed downward in the up-down direction. If the picking portion 63 is pressed downward in the up-down direction, the free portion 66 of the picking portion 63 turns around the base end portion 65 as a pivot downward in the up-down direction and also with the turning of the free portion 66 and also with the turning of the free portion 66, the free portion 68 of the engaging portion 64 turns around the base end portion 67 as a pivot downward in the up-down direction and the insertion protrusion 69 moves downward in the up-down direction. If the insertion protrusion 69 moves downward in the up-down direction, the insertion protrusion 69 moves away from the insertion opening 27 and in this state, the optical connector plug 58 is pulled in the extraction direction of the adapter 10A.

If the optical connector plug 58 is pulled in the extraction direction of the adapter 10A, the engaging portion 64 of the engaging member 61 of the optical connector plug 58 slides through the guide groove 26 and the sheath member 60 slides the both open ends 19, 20. Therefore, the sheath member 60 and the engaging member 61 are gradually extracted from the both open ends 19, 20. Accordingly, the curved portion 52 of the shutter plate 44 gradually rises owing to the elastic force (repulsive force) thereof. If the optical connector plug 58 is extracted from the adapter 10A completely, the bent portion 51 and the curved portion 52 rise completely to restore the state before insertion of the optical connector plug 58 and the bent portion 51 and the curved portion 52 shield the insertion hole 15 of the adapter 10A.

If the optical connector plug 58 is inserted into the both open ends 19, 20 of the insertion hole 15, the bent portion 51 and the curved portion 52 of the shutter plate 44 of the shutter member 17 are pressed by the optical connector plug 58 and fall toward the center portion 21 of the insertion hole 15. Therefore, shielding by the shutter plate 44 is released and the optical fibers 59 can optically be connected. If the optical connector plug 58 is extracted from the both open ends 19, 20 of the insertion hole 15, the shutter plate 44 rises owing to the elastic force (repulsive force) thereof to shield the insertion hole 15 again. Therefore, leakage of light from the adapter 10A can reliably be prevented.

In the adapter 10A, the curved portion 52 of the shutter plate 44 of the shutter member 17 has a curvature radius in the range of 5.0 to 7.5 mm. If the curvature radius is less than 5.0 mm, the curved portion 52 of the shutter plate 44 may come into contact with the ferrule 62 of the optical connector plug 58 when the optical connector plug 58 is inserted into the both open ends 19, 20 of the insertion hole 15, thereby damaging the ferrule 62. If the curvature radius exceeds 7.5, the both open ends 19, 20 of the insertion hole 15 may not be shielded completely by using the shutter plate 44.

Because the curvature radius of the curved portion 52 of the shutter plate 44 is in the above range, when the optical connector plug 58 is inserted through the both open ends 19, 20 of the insertion hole 15, the shutter plate 44 does not come into contact with the ferrule 62 of the optical connector plug 58 in the adapter 10A. Therefore, damage of the ferrule 62 caused by contact of the shutter plate 44 with the ferrule 62 can be prevented. Because the curved portion 52 of the shutter plate 44 is curved with the above curvature radius toward the center portion 21 of the insertion hole 15 in the adapter 10A, durability of the shutter plate 44 is improved with the uniform distribution of elastic force (repulsive force) of the curved portion 52 of the shutter plate 44. Even if the shutter plate 44 repeatedly falls and rises, the insertion hole 15 can reliably be shielded by using the shutter plate 44 in repeated uses without deterioration of the elastic force of the shutter plate 44.

The thickness dimension of the shutter member 17 of the adapter 10A is in the range of 0.01 to 0.1 mm, preferably in the range of 0.02 to 0.06 mm, and particularly preferably in the range of 0.03 to 0.035 mm. The elastic/repulsive force of the curved portion 52 of the shutter plate 44 is in the range of 0.1 to 0.6 N and preferably in the range of 0.2 to 0.4 N. If the thickness dimension of the shutter member 17 exceeds 0.1 mm, the elastic/repulsive force of the curved portion 52 of the shutter plate 44 is more than needed. Thus, it becomes difficult for the curved portion 52 to fall and the optical connector plug 58 may not be smoothly inserted through the both open ends 19, 20 of the insertion hole 15 of the adapter 10A. If the thickness dimension of the shutter member 17 is less than 0.01 mm, the strength of the shutter member 17 deteriorates and when the shutter plate 44 repeatedly falls and rises, the elastic force of the curved portion 52 of the shutter plate 44 may deteriorate in an early stage so that the insertion hole may not be shielded by using the shutter plate 44.

If the elastic/repulsive force of the curved portion 52 of the shutter plate 44 exceeds 0.6 N, it becomes difficult for the curved portion 52 to fall and the optical connector plug 58 may not be smoothly inserted through the both open ends 19, 20 of the insertion hole 15 of the adapter 10A. If the elastic/repulsive force of the curved portion 52 of the shutter plate 44 is less than 0.1 N, when the shutter plate 44 repeatedly falls and rises, the elastic force of the curved portion 52 of the shutter plate 44 may deteriorate in an early stage so that the insertion hole 15 may not be shielded by using the shutter plate 44. Incidentally, the elastic/repulsive force of the curved portion 52 of the shutter plate 44 is measured by inserting a push-pull gauge (not shown) into the insertion hole 15 of the adapter 10A and using the gauge. The elastic/repulsive force of the curved portion 52 is the maximum value measured by the push-pull gauge.

Because the thickness dimension of the shutter member 17 is in the above range, the shutter member 17 in the shape and size can be mass-produced in a short time by press molding. Therefore, the shutter member 17 can be produced at low production costs. As a result, the adapter 10A itself can be produced at low unit costs. Moreover, the optical connector plug 58 can smoothly be inserted into the both open ends 19, 20 of the insertion hole 15 of the adapter 10A. Even if the shutter plate 44 repeatedly falls and rises, the elastic force of the curved portion 52 of the shutter plate 44 does not deteriorate so that the insertion hole 15 can reliably be shielded by using the shutter plate 44.

Because the elastic/repulsive force of the shutter plate 44 is in the above range, when the optical connector plug 58 is inserted into the insertion hole 15 thereof, the shutter plate 44 of the shutter member 17 reliably falls toward the center portion 21 of the insertion hole 15. Therefore, shielding by the shutter plate 44 of the shutter member 17 can reliably be released. When the optical connector plug 58 is pulled out of the both open ends 19, 20 of the insertion hole 15, the curved portion 52 of the shutter plate 44 reliably rises owing to the elastic force (repulsive force) thereof so that the insertion hole 15 can reliably be shielded.

The shutter member 17 of the adapter 10A is formed of the base plate 41, the both side plates 42 extending upward from both side edges of the base plate 41, the connecting plate 43 extending upward from the front edge of the base plate 41, and the shutter plate 44 connected to the connecting plate 43 and curved with the predetermined curvature radius. Thus, the number of parts of the shutter member 17 is small. When the shutter member 17 is produced by press molding, the level of difficulty of processing is low, so that the shutter member 17 in the same shape and size can be mass-produced in a short time by press molding. The shutter member 17 can be produced at low production costs and thus, the adapter 10A itself can be produced at low unit costs. The shutter member 17 can easily be mounted on the adapter 10A by fitting the base plate 41 of the shutter member 17 into the bottom recesses 28 formed on the external surface of the bottom wall 12 of the adapter 10A and fitting the both side plates 42 of the shutter member 17 into the both side recesses 36 formed on the external surface of the both sidewalls 13, 14. That is, mounting of the shutter member 17 on the adapter 10A is easy and the adapter 10A can be assembled without much expense in time and effort and, as a result, the adapter 10A itself can be produced at low unit costs. When the shutter member 17 is mounted on the adapter 10A, outside dimensions of the adapter 10A do not become too large so that the adapter 10A can be contained within the standard outside dimensions.

In the adapter 10A, the first fitting portion 45 of the base plate 41 of the shutter member 17 is fitted into the first recess 31, the second fitting portion 46 of the base plate 41 is fitted into the second recess 32, and the step fitting portion 47 of the base plate 41 is fitted into the step portion 34 and thus, the shutter member 17 is reliably fixed to the adapter 10A and shifts of the shutter member 17 and detachment of the shutter member 17 from the adapter 10A can be prevented so that the insertion hole 15 can reliably be shielded by using the shutter member 17. In the adapter 10A, the step fitting portion 47 formed on the base plate 41 of the shutter plate 17 functions as a rib. Thus, torsion and bending of the base plate 41 can be prevented and the base plate 41 can reliably be brought into close contact with the bottom wall recess 28 of the bottom wall 12 so that the shutter member 17 can reliably be fixed to the adapter 10A.

The internal and external surfaces of the bottom wall 12 of the adapter 10A is sandwiched between the base plate 41 and the fixed portion 50 of the shutter plate 44. Thus, the shutter member 17 is reliably be fixed to the adapter 10A and shifts of the shutter member 17 and detachment of the shutter member 17 from the adapter 10A can be prevented so that the insertion hole 15 can reliably be shielded by using the shutter member 17. In the adapter 10A, the bent portion 51 of the shutter plate 44 of the shutter member 17 is bent at a predetermined angle toward the center portion 21 of the insertion hole 15 and thus, when the optical connector plug 58 is inserted into the both open ends 19, 20 of the insertion hole, an edge of the extending end of the shutter plate 44 does not come into contact with the optical connector plug 58. Therefore, damage of the optical connector plug 58 caused by contact of the edge of the extending end of the shutter plate 44 with the optical connector plug 58 can be prevented. In the adapter 10A, the curved portion 52 of the shutter plate 44 is curved so as to form a convex shape toward the center portion 21 of the insertion hole 15. Thus, durability of the shutter plate 44 is improved with the uniform distribution of elastic force of the shutter plate 44 by the curved portion 52. Even if the shutter plate 44 repeatedly falls and rises, the elastic force of the shutter plate 44 does not deteriorate and the insertion hole 15 can reliably be shielded by using the shutter plate 44 in repeated uses.

Figure 11:
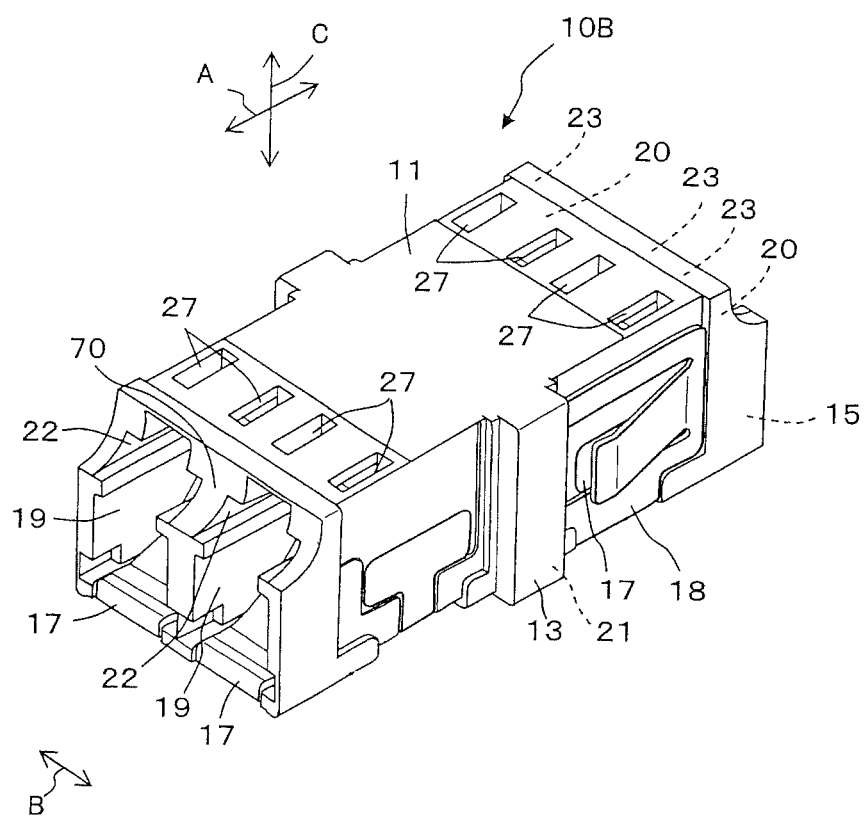
FIG. 11 is a perspective view of the optical connector adapter shown as another example.
Figure 12:
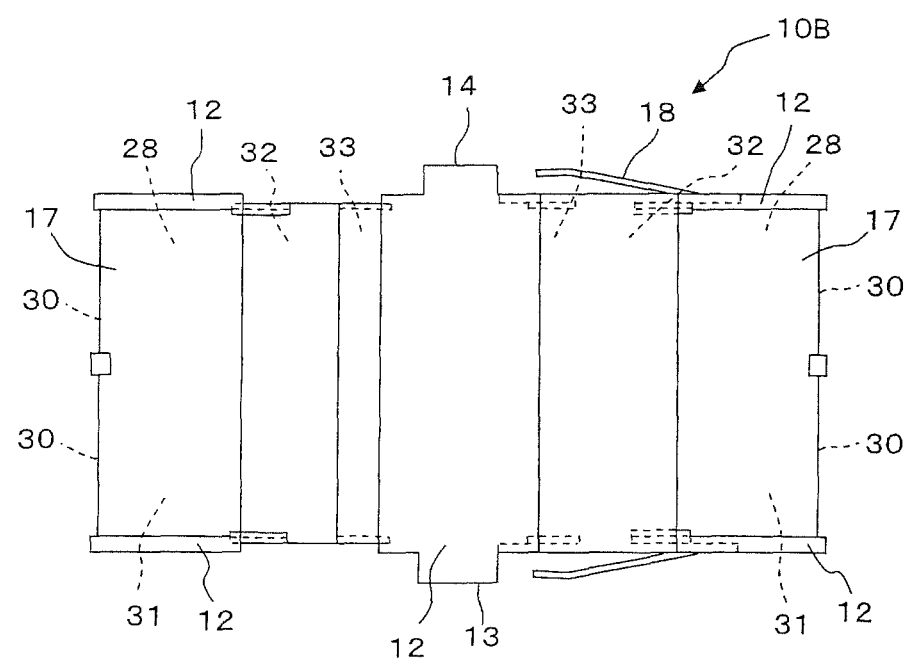
FIG. 12 is a bottom view showing the bottom wall of the adapter in FIG. 11.
Figure 13:
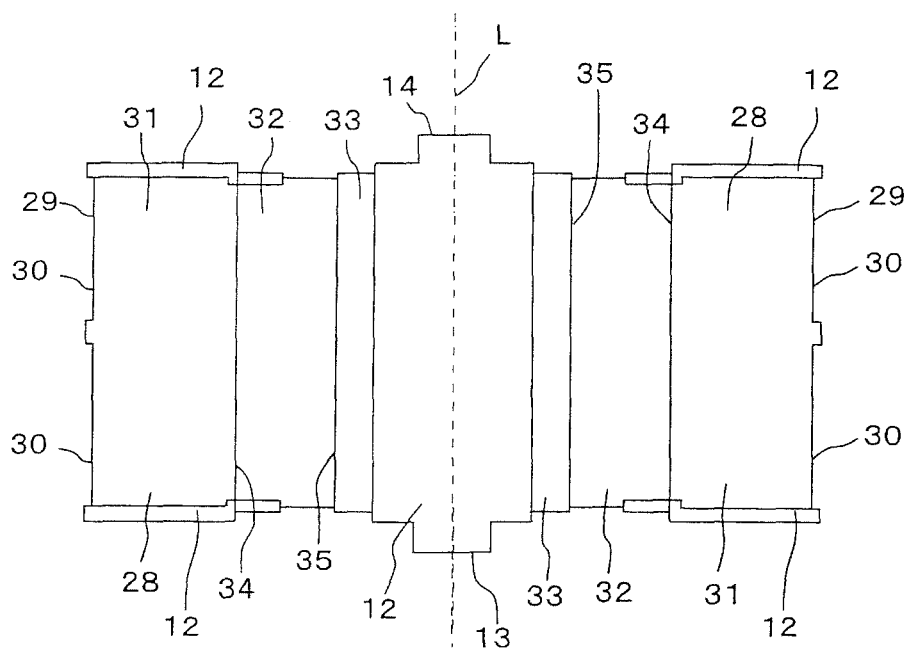
FIG. 13 is a bottom view showing the bottom wall of the adapter in FIG. 11 before the shutter member and the stopper member are mounted.
Figure 14:
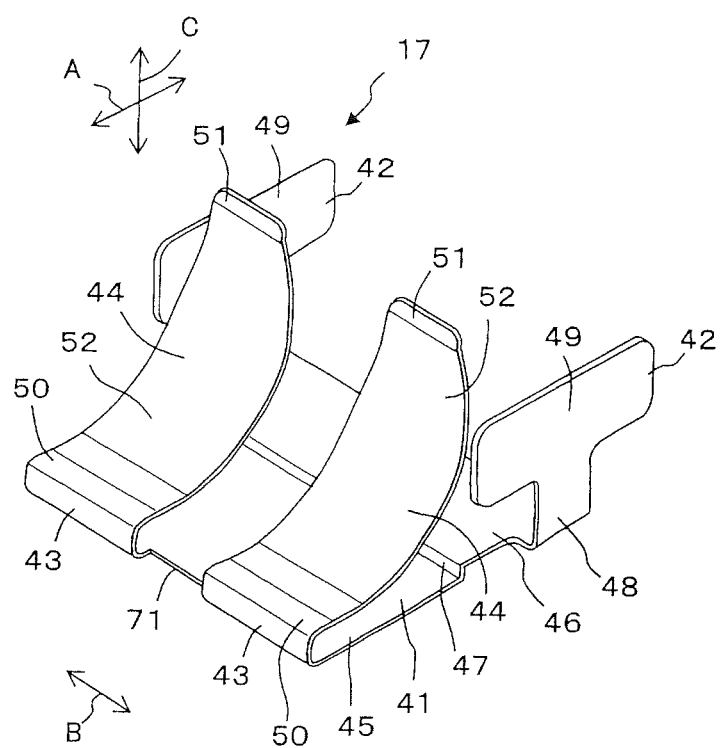
FIG. 14 is a perspective view of the shutter member shown as another example.
Figure 15:
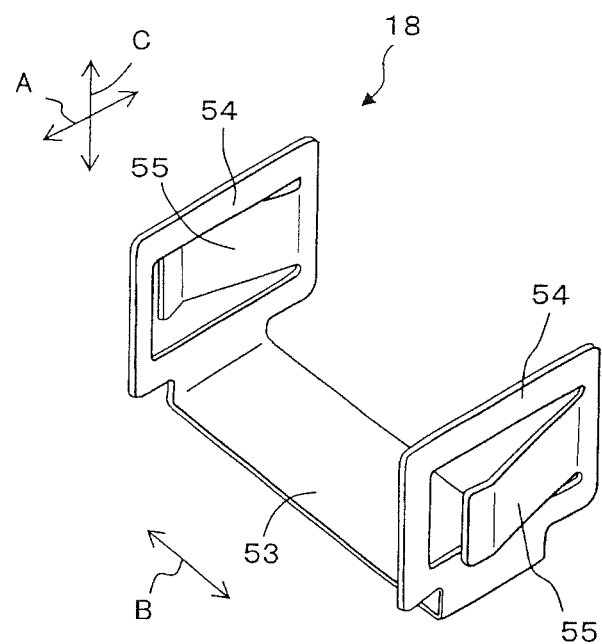
FIG. 15 is a perspective view of the stopper member shown as another example.

FIG. 11 is a perspective view of an optical connector adapter 10B shown as another example and FIG. 12 is a bottom view showing the bottom wall 12 of the adapter 10B in FIG. 11. FIG. 13 is a bottom view showing the bottom wall 12 of the adapter 10B before the shutter member 17 (shielding metal fitting) and the stopper member 18 (locking metal fitting) are mounted and FIG. 14 is a perspective view of the shutter member 17 shown as another example. FIG. 15 is a perspective view of the stopper member 18 shown as another example. In FIGS. 11, 14, and 15, the front-back direction is indicated by the arrow A, the lateral direction by the arrow B, and the up-down direction by the arrow C.

The optical connector adapter 10B is different from the optical connector adapter 10A in FIG. 1 in that the optical connector adapter 10B includes a partition wall 70, the two insertion holes 15 arranged in the lateral direction across the partition wall 70, and the two connecting plates 43 and the two shutter plates 44 arranged in the lateral direction while the shutter member 17 shares the base plate 41. The other configuration of the optical connector adapter 10B is the same as that of the adapter 10A in FIG. 1 and the same reference numerals as those in FIG. 1 are attached and a detailed description of the other configuration of the adapter 1013 will not be repeated by quoting the description of the adapter 10A in FIG. 1.

The adapter 10B includes the top/bottom walls 11, 12 and the both sidewalls 13, 14 extending in the front-back direction, the partition wall 70 positioned between the both sidewalls 13, 14 and extending in the front-back direction, the two insertion holes 15 surrounded by these walls 11 to 14 and 70 and cutting through in the front-back direction, the two sleeve holders 57 and the two segment sleeves for optical connection 16 (FIG. 8 quoted) arranged in the center portion 21 of these insertion holes 15, the shutter member 17, and the stopper member 18. The four engaging portions 22, 23 with which the engaging member 61 (FIG. 9 quoted) of the optical connector plug 58 is removably engaged are formed in the both open ends 19, 20 of the insertion holes 15 of the adapter 10B.

These engaging portions 22, 23 are formed of the first flange 24 formed in the both sidewalls 13, 14 and the partition wall 70 and extending from the both open ends 19, 20 toward the center portion 21 in the front-back direction, the second flange 25 formed at an intersection of the top wall 11 and the both sidewalls 13, 14 and at an intersection of the top wall 11 and the partition wall 70 and extending from the both open ends 19, toward the center portion 21 in the front-back direction, the guide groove 26 positioned between these flanges 24, 25 and extending in the front-back direction, and the insertion opening 27 formed in the top wall 11 and into which the insertion protrusion 69 (FIGS. 9, 10 quoted) of the engaging member 61 of the optical connector plug 58 is removably inserted. The second flange 25 is inclined downward in the up-down direction from the both open ends 19, 20 toward the center portion 21.

The two bottom recesses 28 recessed in the up-down direction toward the internal surface of the bottom wall 12 are formed on the external surface of the bottom wall 12 of the adapter 10B. These bottom recesses 28 are formed symmetrically by sandwiching the center line L therebetween. The four accommodation recesses 56 recessed in the up-down direction toward the external surface of the bottom wall 12 are formed on the internal surface of the bottom wall 12 of the adapter 10B (FIG. 8 quoted). These accommodation recesses 56 have a plane shape slightly larger than that of the bent portion 51 and the curved portion 52 of the shutter member 17 and so can accommodate the bent portion 51 and the curved portion 52. The four end face recesses 30 recessed toward the center portion 21 of the insertion holes 15 are formed on the both end faces 29 (end face) of the bottom wall 12 of the adapter 103. The end face recesses 30 are formed symmetrically by sandwiching the center line L therebetween.

As shown in FIG. 13, the bottom recess 28 is formed of the first recess 31 positioned on the side of the both open ends 19, 20 of the insertion holes 15, the second recess 32 positioned on the side of the center portion 21, the third recess 33 positioned on the rear side in the front-back direction of the second recess 32, the step portion 34 connected to the first recess 31 and the second recess 32, and the step portion 35 connected to the second recess 32 and the third recess 33.

In the first recess 31, both edges thereof in the lateral direction are positioned on the inner side of the bottom wall 12 and a step height arises between the both edges of the first recess 31 in the lateral direction and the bottom wall 12. The second recess 32 has a depth dimension deeper than that of the first recess 31 and also deeper than that of the third recess 33. The third recess 33 has a depth dimension deeper than that of the first recess 31 and shallower than that of the second recess 32. A step height arises between the third recess 33 and the bottom wall 12, a step height arises between the first recess 31 and the second recess 32, and also a step height arises between the third recess 33 and the second recess 32.

The both side recesses 36 recessed in the lateral direction from the external surface of the both sidewalls 13, 14 toward the internal surface thereof are formed on the external surface of the both sidewalls 13, 14 (FIG. 3 quoted). The both side recesses 36 are formed in the same shape on the one sidewall 13 and on the other sidewall 14 and formed symmetrically across the center line L. The both side recesses 36 include the fourth recess 37 positioned on the side of the bottom wall 12 and connected to the third recess 33 and the fifth recess 38 positioned on the inner side of the fourth recess 37 and connected to the second recess 32 (FIG. 5 quoted).

The fifth recess 38 has a depth dimension deeper than that of the fourth recess 37. The fifth recess 38 includes the narrow portion 39 connected to the second recess 32 and whose width dimension in the front-back direction is narrow and the wide portion 40 connected to the narrow portion 39. A step height arises between the fourth recess 37 and the both sidewalls 13, 14 and also a step height arises between the fourth recess 37 and the fifth recess 38.

As shown in FIG. 14, the shutter member 17 includes the substantially rectangular base plate 41, the both side plates 42 extending upward from both side edges of the base plate 41, the two connecting plates 43 positioned between the both side plates 42 and extending upward from the front edge of the base plate 41, and the two shutter plates 44 connected to the connecting plates 43 and extending upward from the base plate 41. The base plate 41 includes the first fitting portion 45 positioned on the front side in the front-back direction, the second fitting portion 46 positioned on the rear side in the front-back direction, the step fitting portion 47 positioned between the first and second fitting portions 45, 46, and a recess 71 positioned between the shutter plates 44 and recessed (on the rear side in the front-back direction) toward the center portion 21 of the insertion holes 15.

The first fitting portion 45 of the base plate 41 has a plane shape substantially the same as the shape of the first recess 31 of the bottom wall 12 in shape and size and the second fitting portion 46 has a plane shape substantially the same as the shape of the second recess 32 of the bottom wall 12 in shape and size. The step fitting portion 47 has a plane shape substantially the same as the shape of the step portion 34 of the bottom wall 12 in shape and size. The both side plates 42 of the shutter member 17 have a plane shape substantially the same as the shape of the fifth recess 38 of the both sidewalls 13, 14 in shape and size. The both side plates 42 have the narrow portion 48 connected to the base plate 41 and whose width dimension in the front-back direction is narrow and the wide portion 49 connected to the narrow portion 48. The narrow portion 48 has a plane shape substantially the same as that of the narrow portion 39 of the fifth recess 38 in shape and size. The wide portion 49 has a plane shape substantially the same as that of the wide portion 40 of the fifth recess 38 in shape and size.

These shutter plates 44 are elastically deformable with the side of the connecting plates 43 set as the base end. These shutter plates 44 include the fixed portion 50 positioned at the base end and connected to the connecting plate 43, the bent portion 51 positioned at the extending end thereof and bent at a predetermined angle with respect to the center portion 21 of the insertion hole 15, and the curved portion 52 positioned between the fixed portion 50 and the bent portion 51 to draw an arc so that the arc is convex toward the center portion 21 of the insertion hole 15.

As shown in FIG. 11, the shutter member 17 is removably fixed to the both open ends 19, 20 of the insertion hole 15. The first fitting portion 45 of the base plate 41 of the shutter member 17 is fitted into the first recess 31 of the bottom wall 12 and is fitted to and in close contact with the whole first recess 31. The second fitting portion 46 of the base plate 41 of the shutter member 17 is fitted into the second recess 32 of the bottom wall 12 and is fitted to and in close contact with the whole second recess 32. The step fitting portion 47 of the base plate 41 of the shutter member 17 is fitted to and in close contact with the step portion 34 of the bottom wall 12.

The both side plates 42 of the shutter member 17 are fitted into the fifth recess 38 of the both sidewalls 13, 14 and are fitted to and in close contact with the fifth recess 38. The narrow portion 48 of the both side plates 42 is fitted into the narrow portion 39 of the fifth recess 38 and is fitted to and in close contact with the whole portion 39 and the wide portion 49 of the both side plates 42 is fitted into the wide portion 40 of the fifth recess 38 and is fitted to and in close contact with the wide portion 40. The connecting plates 43 of the shutter member 17 are fitted to and in close contact with the end face recess 30 of the bottom wall end face 29. The bent portion 51 and the curved portion 52 of the shutter plates 44 of the shutter member 17 are positioned at the both open ends 19, 20 of the insertion holes 15 to shield the insertion holes 15. In the shutter member 17, the internal and external surfaces of the bottom wall 12 of the adapter 10B are sandwiched between the first fitting portion 45 of the base plate 41 and the fixed portion 50 of the shutter plate 44.

As shown in FIG. 15, the stopper member 18 includes the Substantially rectangular base plate 53, the both side plates 54 extending upward from both side edges of the base plate 53, and the locking plate 55 formed on the both side plates 54 and extending by being tilted to spread out outward in the lateral direction. The base plate 53 of the stopper member 18 has a plane shape substantially the same as a combined shape of the second recess 32 and the third recess 33 of the bottom wall 12 in shape and size. The both side plates 54 of the stopper member 18 have a plane shape substantially the same as a combined shape of the fourth recess 37 and the fifth recess 38 of the both sidewalls 13, 14 in shape and size.

The stopper member 18 is removably fixed to the one open end 20 of the adapter 10B while being overlaid on the shutter member 17. The base plate 53 of the stopper member 18 is fitted into the third recess 33 of the bottom wall 12 while being overlaid on the second fitting portion 46 of the base plate 41 of the shutter member 17 and is fitted to and in close contact with the whole third recess 33. The both side plates 54 of the stopper member 18 are fitted into the fourth recess 37 of the both sidewalls 13, 14 while being overlaid on the both side plates 42 of the shutter member 17 and are fitted to and in close contact with the whole fourth recess 37.

Like the adapter 10A in FIG. 1, the adapter 10B is mounted at predetermined positions of a mounting panel, various apparatuses, and various devices used for optical communication by using the locking plate 55 of the stopper member 18. The procedure for inserting the optical connector plug 58 into the adapter 10B and the procedure for extracting the optical connector plug 58 from the adapter 10B are the same as those for the adapter 10A in FIG. 1. Thus, FIGS. 9 and 10 are quoted and a description thereof will not be repeated by quoting the description of FIGS. 9 and 10. The configuration of the optical connector plug 58 is the same as that illustrated in FIGS. 9 and 10.

The curvature radius of the curved portion 52 of the shutter plate 44 of the shutter member 17 in the adapter 10B is the same as that of the curved portion 52 of the shutter plate 44 of the shutter member 17 of the adapter 10A in FIG. 1. The thickness dimension of the shutter member 17 of the adapter 10B is the same as that of the shutter member 17 of the adapter 10A in FIG. 1 and the elastic/repulsive force of the curved portion 52 of the shutter plate 44 in the adapter 10B is the same as that of the curved portion 52 of the shutter plate 44 in FIG. 1. The measuring method of the elastic/repulsive force of the curved portion 52 of the shutter plate 44 is the same as that of the curved portion 52 of the shutter plate 44 in FIG. 1.

In addition to the effects achieved by the adapter 10A in FIG. 1, the optical connector adapter 10B achieves effects described below. The adapter 10B allows the two optical connector plugs for optical fiber connection 58 arranged in the lateral direction to be inserted through the both open ends 19, 20 of the insertion holes 15 so that an optical connection can be established via these optical connector plugs 58 to enable optical connections by a plurality of paths at the same time. The shutter member 17 of the adapter 10B is formed of the base plate 41, the both side plates 42 extending upward from both side edges of the base plate 41, the two connecting plates 43 extending upward from the front edge of the base plate 41, and the two shutter plates 44 connected to the connecting plates 43 and curved with the predetermined curvature radius. Thus, the number of parts of the shutter member 17 is small and even when the shutter member 17 is produced by press molding, the level of difficulty of processing is low so that the shutter member 17 in the same shape and size can be mass-produced in a short time by press molding. The shutter member 17 can be produced at low production costs and, as a result, the adapter 10B itself can be produced at low unit costs.

In the adapter 10B, even if one of the shutter plates 44 of the shutter plate 17 should fall against the elastic force thereof owing to the insertion of the optical connector plug 58, the force of falling of the one shutter plate 44 is not transmitted to the other shutter plate 44 arranged in the lateral direction thanks to the recess 71. Therefore, even if one of the shutter plates 44 should fall, the other shutter plate 44 will not fall following the one shutter plate 44 so that the other insertion hole 15 can reliably be shielded by the other shutter plate 44.

Figure 16:
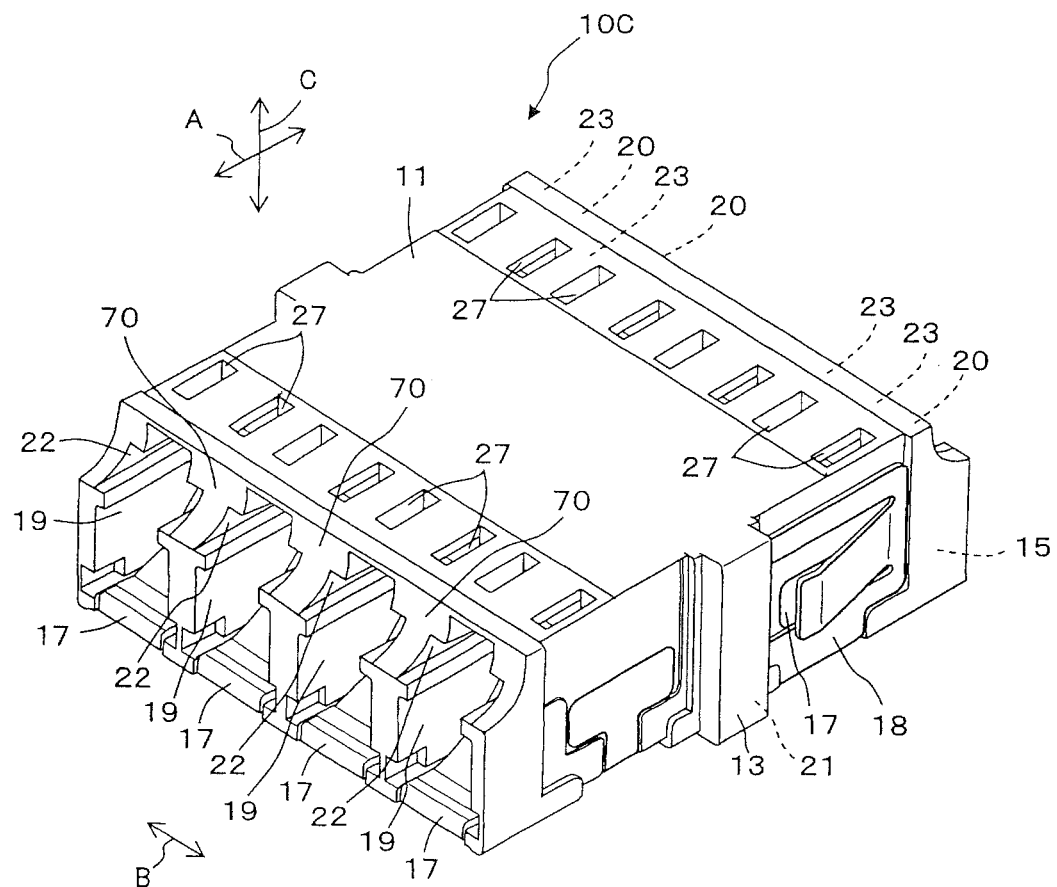
FIG. 16 is a perspective view of the optical connector adapter shown as still another example.
Figure 17:
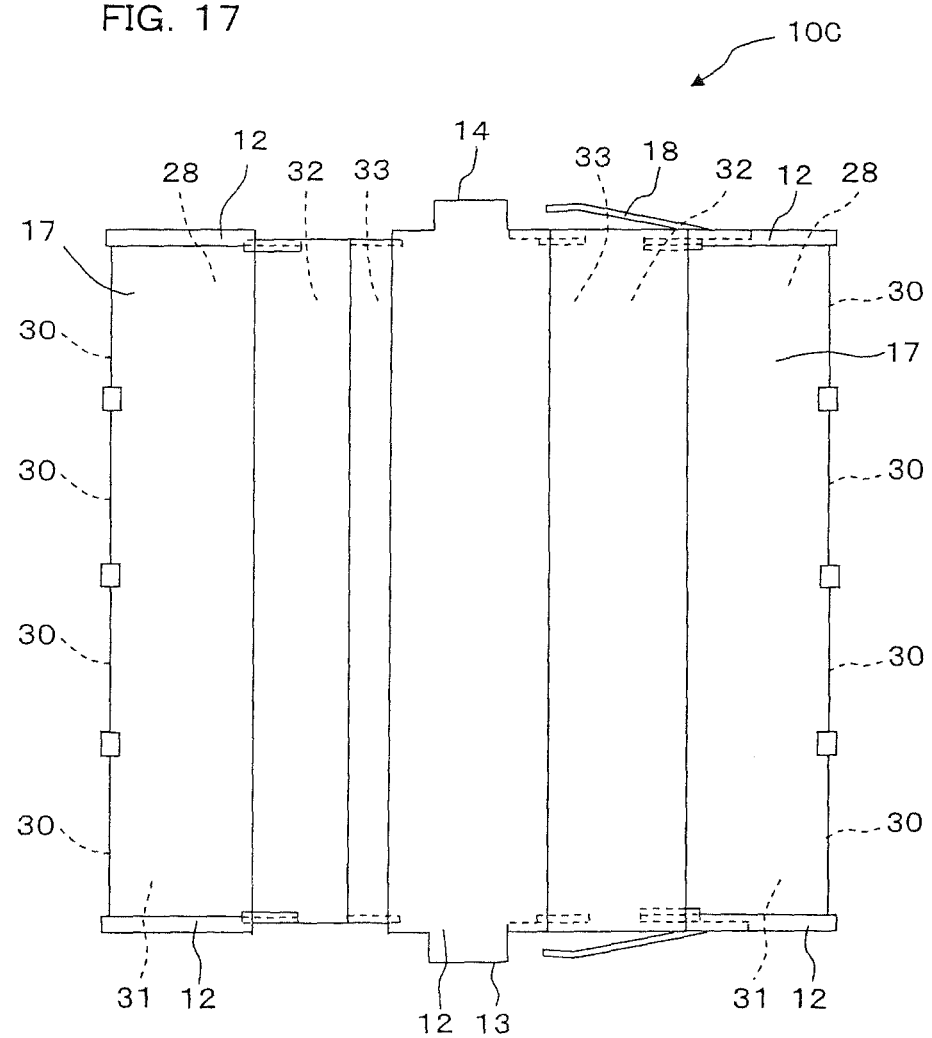
FIG. 17 is a bottom view showing the bottom wall of the adapter in FIG. 16.
Figure 18:
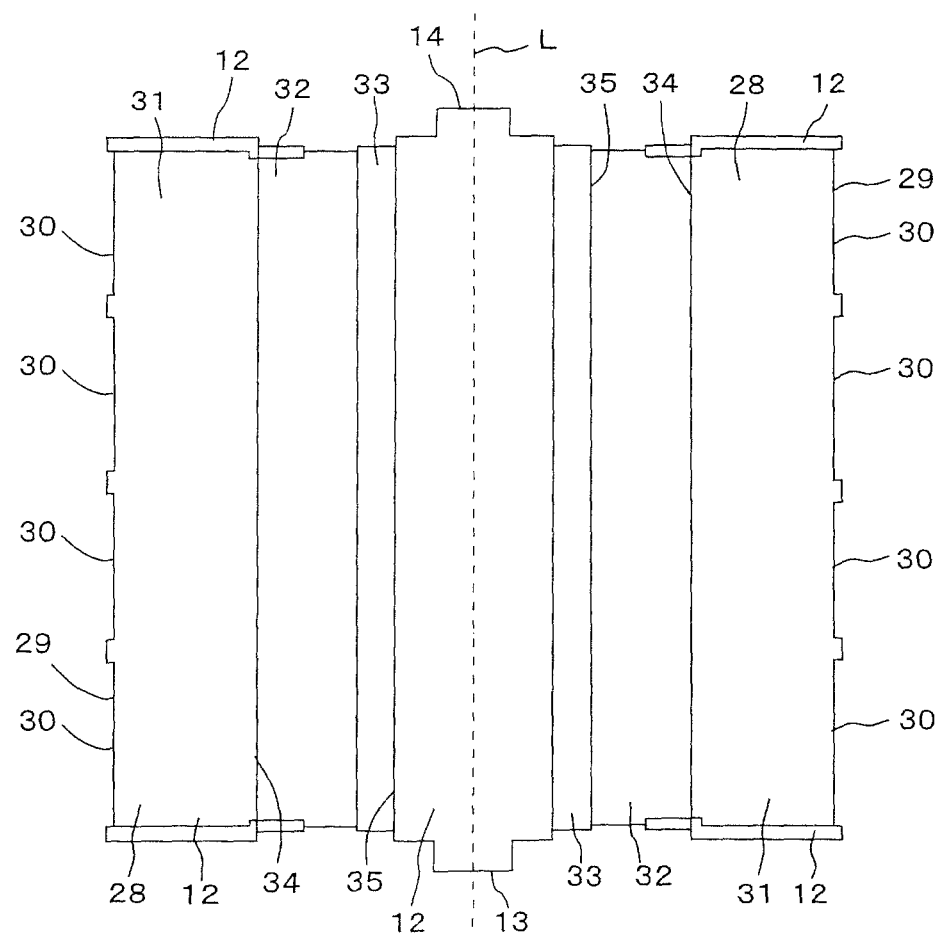
FIG. 18 is a bottom view showing the bottom wall of the adapter in FIG. 16 before the shutter member and the stopper member are mounted.
Figure 19:
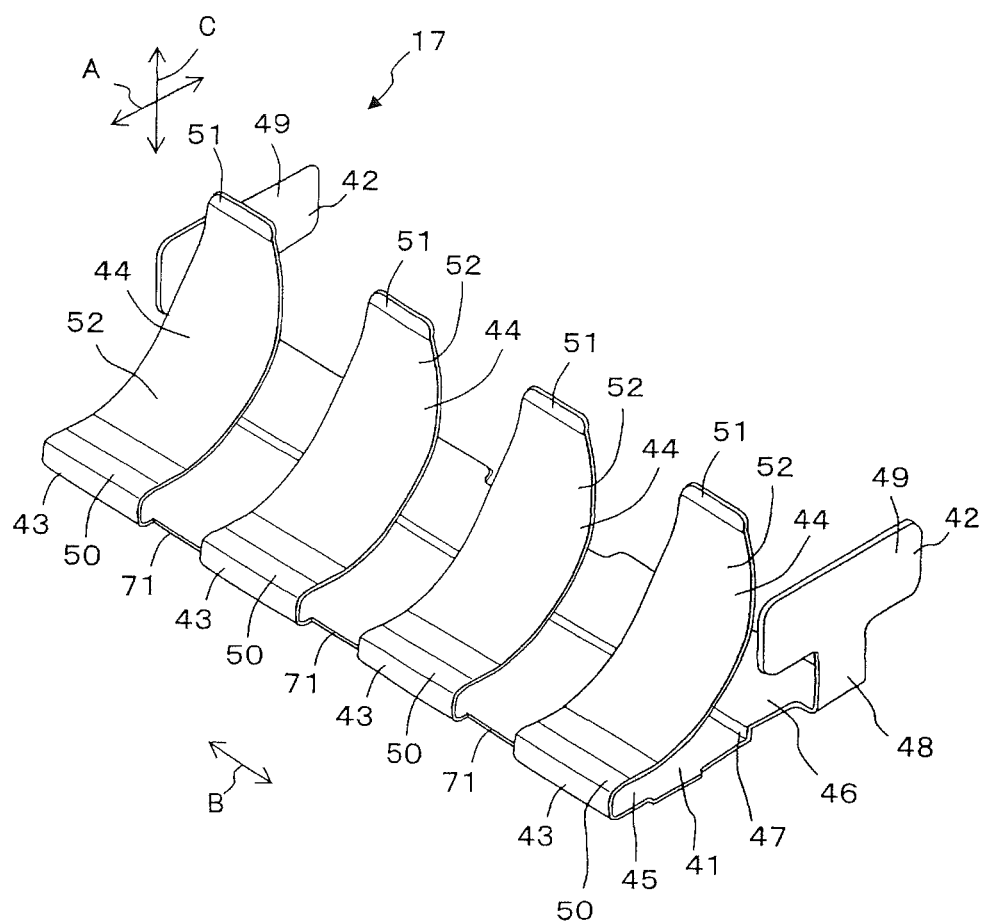
FIG. 19 is a perspective view of the shutter member shown as still another example.
Figure 20:
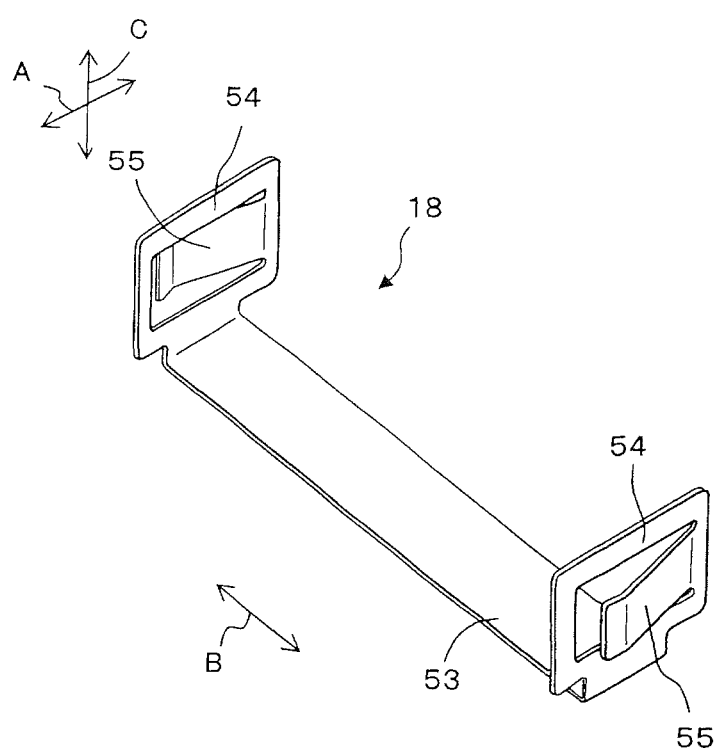
FIG. 20 is a perspective view of the stopper member shown as still another example.

FIG. 16 is a perspective view of an optical connector adapter 10C shown as another example and FIG. 17 is a bottom view showing the bottom wall 12 of the adapter 10C in FIG. 16. FIG. 18 is a bottom view showing the bottom wall 12 of the adapter 10C before the shutter member 17 (shielding metal fitting) and the stopper member 18 (locking metal fitting) are mounted and FIG. 19 is a perspective view of the shutter member 17 shown as another example. FIG. 20 is a perspective view of the stopper member 18 shown as another example. In FIGS. 16, 19, and 20, the front-back direction is indicated by the arrow A, the lateral direction by the arrow B, and the up-down direction by the arrow C.

The optical connector adapter 10C is different from the optical connector adapter 10A in FIG. 1 in that the optical connector adapter 10C includes the partition wall 70, the four insertion holes 15 arranged in the lateral direction across the partition wall 70, and the four connecting plates 43 and the four shutter plates 44 arranged in the lateral direction while the shutter member 17 shares the base plate 41. The other configuration of the optical connector adapter 10C is the same as that of the adapter 10A in FIG. 1 and the same reference numerals as those in FIG. 1 are attached and a detailed description of the other configuration of the adapter 10C will not be repeated by quoting the description of the adapter 10A in FIG. 1.

The adapter 10C includes the top/bottom walls 11, 12 and the both sidewalls 13, 14 extending in the front-back direction, the partition wall 70 positioned between the both sidewalls 13, 14 and extending in the front-back direction, the four insertion holes 15 surrounded by these walls 11 to 14 and 70 and cutting through in the front-back direction, the four sleeve holders 57 and the four segment sleeves for optical connection 16 (FIG. 8 quoted) arranged in the center portion 21 of these insertion holes 15, the shutter member 17, and the stopper member 18. The eight engaging portions 22, 23 with which the engaging member 61 (FIG. 9 quoted) of the optical connector plug 58 is removably engaged are formed in the both open ends 19, 20 of the adapter 100.

These engaging portions 22, 23 are formed of the first flange 24 formed in the both sidewalls 13, 14 and the partition wall 70 and extending from the both open ends 19, 20 toward the center portion 21 in the front-back direction, the second flange 25 formed at an intersection of the top wall 11 and the both sidewalls 13, 14 and at an intersection of the top wall 11 and the partition wall 70 and extending from the both open ends 19, 20 toward the center portion 21 in the front-back direction, the guide groove 26 positioned between these flanges 24, 25 and extending in the front-back direction, and the insertion opening 27 formed in the top wall 11 and into which the insertion protrusion 69 (FIGS. 9, 10 quoted) of the engaging member 61 of the optical connector plug 58 is removably inserted. The second flange 25 is inclined downward in the up-down direction from the both open ends 19, 20 toward the center portion 21.

The two bottom recesses 28 recessed in the up-down direction toward the internal surface of the bottom wall 12 are formed on the external surface of the bottom wall 12 of the adapter 10C. These bottom recesses 28 are formed symmetrically by sandwiching the center line L therebetween. The eight accommodation recesses 56 recessed in the up-down direction toward the external surface of the bottom wall 12 are formed on the internal surface of the bottom wall 12 of the adapter 10C (FIG. 8 quoted). These accommodation recesses 56 have a plane shape slightly larger than that of the bent portion 51 and the curved portion 52 of the shutter member 17 and so can accommodate the bent portion 51 and the curved portion 52. The eight end face recesses 30 recessed toward the center portion 21 of the insertion hole 15 are formed on the both end faces 29 (end face) of the bottom wall 12 of the adapter 10C. The end face recesses 30 are formed symmetrically by sandwiching the center line L therebetween.

As shown in FIG. 18, the bottom recess 28 includes the first recess 31 positioned on the side of the both open ends 19, 20 of the insertion hole 15, the second recess 32 positioned on the side of the center portion 21, the third recess 33 positioned on the rear side in the front-back direction of the second recess 32, the step portion 34 connected to the first recess 31 and the second recess 32, and the step portion 35 connected to the second recess 32 and the third recess 33.

In the first recess 31, both edges thereof in the lateral direction are positioned on the inner side of the bottom wall 12 and a step height arises between the both edges of the first recess 31 in the lateral direction and the bottom wall 12. The second recess 32 has a depth dimension deeper than that of the first recess 31 and also deeper than that of the third recess 33. The third recess 33 has a depth dimension deeper than that of the first recess 31 and shallower than that of the second recess 32. A step height arises between the third recess 33 and the bottom wall 12, a step height arises between the first recess 31 and the second recess 32, and also a step height arises between the third recess 33 and the second recess 32.

The both side recesses 36 recessed in the lateral direction from the external surface of the both sidewalls 13, 14 toward the internal surface thereof are formed on the external surface of the both sidewalls 13, 14 (FIG. 3 quoted). The both side recesses 36 are formed in the same shape on the one sidewall 13 and on the other sidewall 14 and formed symmetrically across the center line L. The both side recesses 36 include the fourth recess 37 positioned on the side of the bottom wall 12 and connected to the third recess 33 and the fifth recess 38 positioned on the inner side of the fourth recess 37 and connected to the second recess 32 (FIG. 5 quoted).

The fifth recess 38 has a depth dimension deeper than that of the fourth recess 37. The fifth recess 38 includes the narrow portion 39 connected to the second recess 32 and whose width dimension in the front-back direction is narrow and the wide portion 40 connected to the narrow portion 39. A step height arises between the fourth recess 37 and the both sidewalls 13, 14 and also a step height arises between the fourth recess 37 and the fifth recess 38.

As shown in FIG. 19, the shutter member 17 includes the substantially rectangular base plate 41, the both side plates 42 extending upward from both side edges of the base plate 41, the four connecting plates 43 positioned between the both side plates 42 and extending upward from the front edge of the base plate 41, and the four shutter plates 44 connected to the connecting plates 43 and extending upward from the base plate 41. The base plate 41 includes the first fitting portion 45 positioned on the front side in the front-back direction, the second fitting portion 46 positioned on the rear side in the front-back direction, the step fitting portion 47 positioned between the first and second fitting portions 45, 46, and the three recesses 71 positioned between the shutter plates 44 and recessed (on the rear side in the front-back direction) toward the center portion 21 of the insertion holes 15.

The first fitting portion 45 of the base plate 41 has a plane shape substantially the same as the shape of the first recess 31 of the bottom wall 12 in shape and size and the second fitting portion 46 has a plane shape substantially the same as the shape of the second recess 32 of the bottom wall 12 in shape and size. The step fitting portion 47 has a plane shape substantially the same as the shape of the step portion 34 of the bottom wall 12 in shape and size. The both side plates 42 of the shutter member 17 have a plane shape substantially the same as the shape of the fifth recess 38 of the both sidewalls 13, 14 in shape and size. The both side plates 42 have the narrow portion 48 connected to the base plate 41 and whose width dimension in the front-back direction is narrow and the wide portion 49 connected to the narrow portion 48. The narrow portion 48 has a plane shape substantially the same as that of the narrow portion 39 of the fifth recess 38 in shape and size. The wide portion 49 has a plane shape substantially the same as that of the wide portion 40 of the fifth recess 38 in shape and size.

These shutter plates 44 are elastically deformable with the side of the connecting plates 43 set as the base end. These shutter plates 44 include the fixed portion 50 positioned at the base end and connected to the connecting plate 43, the bent portion 51 positioned at the extending end thereof and bent at a predetermined angle with respect to the center portion 21 of the insertion hole 15, and the curved portion 52 positioned between the fixed portion 50 and the bent portion 51 to draw an arc so that the arc is convex toward the center portion 21 of the insertion hole 15.

As shown in FIG. 16, the shutter member 17 is removably fixed to the both open ends 19, 20 of the insertion hole 15. The first fitting portion 45 of the base plate 41 of the shutter member 17 is fitted into the first recess 31 of the bottom wall 12 and is fitted to and in close contact with the whole first recess 31. The second fitting portion 46 of the base plate 41 of the shutter member 17 is fitted into the second recess 32 of the bottom wall 12 and is fitted to and in close contact with the whole second recess 32. The step fitting portion 47 of the base plate 41 of the shutter member 17 is fitted to and in close contact with the step portion 34 of the bottom wall 12.

The both side plates 42 of the shutter member 17 are fitted into the fifth recess 38 of the both sidewalls 13, 14 and are fitted to and in close contact with the fifth recess 38. The narrow portion 48 of the both side plates 42 is fitted into the narrow portion 39 of the fifth recess 38 and is fitted to and in close contact with the whole narrow portion 39 and the wide portion 49 of the both side plates 42 is fitted into the wide portion 40 of the fifth recess 38 and is fitted to and in close contact with the wide portion 40. The connecting plates 43 of the shutter member 17 are fitted to and in close contact with the end face recess 30 of the bottom wall end face 29. The bent portion 51 and the curved portion 52 of the shutter plates 44 of the shutter member 17 are positioned at the both open ends 19, 20 of the insertion holes 15 to shield the insertion holes 15. In the shutter member 17, the internal and external surfaces of the bottom wall 12 of the adapter 10C are sandwiched between the first fitting portion 45 of the base plate 41 and the fixed portion 50 of the shutter plate 44.

As shown in FIG. 20, the stopper member 18 includes the substantially rectangular base plate 53, the both side plates 54 extending upward from both side edges of the base plate 53, and the locking plate 55 formed on the both side plates 54 and extending by being tilted to spread out outward in the lateral direction. The base plate 53 of the stopper member 18 has a plane shape substantially the same as a combined shape of the second recess 32 and the third recess 33 of the bottom wall 12 in shape and size. The both side plates 54 of the stopper member 18 have a plane shape substantially the same as a combined shape of the fourth recess 37 and the fifth recess 38 of the both sidewalls 13, 14 in shape and size.

The stopper member 18 is removably fixed to the one open end 20 of the adapter 10C while being overlaid on the shutter member 17. The base plate 53 of the stopper member 18 is fitted into the third recess 33 of the bottom wall 12 while being overlaid on the second fitting portion 46 of the base plate 41 of the shutter member 17 and is fitted to and in close contact with the whole third recess 33. The both side plates 54 of the stopper member 18 are fitted into the fourth recess 37 of the both sidewalls 13, 14 while being overlaid on the both side plates 42 of the shutter member 17 and are fitted to and in close contact with the whole fourth recess 37.

Like the adapter 10A in FIG. 1, the adapter 10C is mounted at predetermined positions of a mounting panel, various apparatuses, and various devices used for optical communication by using the locking plate 55 of the stopper member 18. The procedure for inserting the optical connector plug 58 into the adapter 10C and the procedure for extracting the optical connector plug 58 from the adapter 10C are the same as those for the adapter 10A in FIG. 1. Thus, FIGS. 9 and 10 are quoted and a description thereof will not be repeated by quoting the description of FIGS. 9 and 10. The configuration of the optical connector plug 58 is the same as that illustrated in FIGS. 9 and 10.

The curvature radius of the curved portion 52 of the shutter plate 44 of the shutter member 17 in the adapter 10C is the same as that of the curved portion 52 of the shutter plate 44 of the shutter member 17 in the adapter 10A in FIG. 1. The thickness dimension of the shutter member 17 of the adapter 10C is the same as that of the shutter member 17 of the adapter 10A in FIG. 1 and the elastic/repulsive force of the curved portion 52 of the shutter plate 44 in the adapter 10C is the same as that of the curved portion 52 of the shutter plate 44 in FIG. 1. The measuring method of the elastic/repulsive force of the curved portion 52 of the shutter plate 44 is the same as that of the curved portion 52 of the shutter plate 44 in FIG. 1.

In addition to the effects achieved by the adapter 10A in FIG. 1, the optical connector adapter 10C achieves effects described below. The adapter 10C allows the four optical connector plugs for optical fiber connection 58 arranged in the lateral direction to be inserted through the both open ends 19, 20 of the insertion holes 15 so that an optical connection can be established via these optical connector plugs 58 to enable optical connections by a plurality of paths at the same time. The shutter member 17 of the adapter 10C is formed of the base plate 41, the both side plates 42 extending upward from both side edges of the base plate 41, the four connecting plates 43 extending upward from the front edge of the base plate 41, and the four shutter plates 44 connected to the connecting plates and curved with the predetermined curvature radius. Thus, the number of parts of the shutter member 17 is small. Even when the shutter member 17 is produced by press molding, the level of difficulty of processing is low so that the shutter member 17 in the same shape and size can be mass-produced in a short time by press molding. The shutter member 17 can be produced at low production costs and, as a result, the adapter 10C itself can be produced at low unit costs.

In the adapter 10C, even if one of the shutter plates 44 of the shutter plate 17 should fall against the elastic force thereof owing to the insertion of the optical connector plug 58, the force of falling of the one shutter plate 44 is not transmitted to the other shutter plates 44 arranged in the lateral direction thanks to the recess 71. Therefore, even if one of the shutter plates 44 should fall, the other shutter plates 44 will not fall following the one shutter plate 44 so that the other insertion holes 15 can reliably be shielded by the other shutter plates 44.

In the adapter 10B in FIG. 11 and the adapter 10C in FIG. 16, the one partition wall 70 or the three partition walls 70 are installed and the two insertion holes 15 or the four insertion holes 15 are arranged in the lateral direction, but the number of the partition walls 70 is not specifically limited and the two or more partition walls 70 or the or more four partition walls 70 may be installed or the three or more insertion holes 15 or the five or more insertion holes 15 may be arranged in the lateral direction. In such a case, the three or more connecting plates 43 and shutter plates 44 or the five or more connecting plates 43 and shutter plates 44 are formed in the shutter member 17 in accordance with the number of insertion holes. In the adapters 10A, 10B, and 10C in FIGS. 1, 11, and 16 respectively, the stopper member 18 is installed on the one end 20, but the stopper member 18 may be installed on the other end 19 only or on the both ends 19, 20.

10A Optical connector adapter
10B Optical connector adapter
10C Optical connector adapter
11 Top wall
12 Bottom wall
13 Sidewall
14 Sidewall
15 Insertion hole
16 Sleeve for optical connection
17 Shutter member
18 Stopper member
19 Open end
20 Open end
21 Center portion
28 Bottom recess
29 Both end faces
30 End face recess
31 First recess
32 Second recess
33 Third recess
34 Step portion
36 Both side recesses
37 Fourth recess
38 Fifth recess
41 Base plate
42 Both side plates
43 Connecting plate
44 Shutter plate
45 First fitting portion
46 Second fitting portion
47 Step fitting portion
50 Fixed portion
51 Bent portion
52 Curved portion
70 Partition wall
71 Recess
L Center line

What is claimed is:

1. An optical connector adapter with shutter having top/bottom walls and both sidewalls and an insertion hole surrounded by the top/bottom walls and both side walls, cutting through in the front-back direction to allow optical connector plug to be attachably and detachably inserted, a sleeve installed in a center portion of the insertion hole to support a ferrule of the optical connector plug, and a shutter member capable of opening/closing an end of the insertion hole, wherein the shutter member includes a base plate, both side plates extending upward from both side edges of the base plate, a connecting plate positioned between the both side plates and extending upward from a front edge of the base plate, and an elastically deformable shutter plate connected to the connecting plate at the end of the insertion hole and curved with a predetermined curvature radius, and the base plate of the shutter member is fitted into a bottom recess formed on an external surface of a bottom wall of the adapter, the both side plates of the shutter member is fitted into both side recesses formed on the external surface of the both sidewalls of the adapter, and the shutter plate of the shutter member is positioned at the end of the insertion hole, and the shutter plate closes the end the insertion hole, extending upward from the connecting plate, when the optical connector plug is not inserted into the insertion hole, and the shutter plate opens the end of the insertion hole, falling toward the center portion of the insertion hole by being pressed by the optical connector plug, when the optical connector plug is inserted into the insertion hole, the connecting plate of the shutter member is fitted into an end face recess formed on a bottom wall end face of the adapter, the base plate of the shutter member is in close contact with a bottom recess formed on the external surface of the bottom wall, and the both side plates of the shutter member are in close contact with both side recesses formed on the external surface of the both sidewalls, the adapter contains at least one partition wall positioned between the both sidewalls and extending in the front-back direction and includes at least the two insertion holes arranged in the direction along with the partition wall, the shutter member includes at least the two connecting plates and the two shutter plates arranged in the lateral direction while sharing the base plate, and these shutter plates are positioned at the edges of these insertion holes and curved to form the convex shape toward the center portion of the insertion holes.

2. The optical connector adapter with shutter according to claim 1, wherein an accommodation recess that is recessed toward the external surface of the bottom wall and accommodates the shutter plate of the shutter member when the shutter plate falls toward the center portion of the insertion hole is formed on the internal surface of the bottom wall of the adapter.

3. The optical connector adapter with shutter according to claim 2, wherein the shutter plate of the shutter member includes a fixed portion positioned at a base end and in close contact with the internal surface of the bottom wall, a bent portion positioned at an extending end of the shutter plate and bent at a predetermined angle with respect to the center portion of the insertion hole, and a curved portion positioned between the fixed portion and the bent portion and curved to form a convex shape toward the center portion of the insertion hole.

4. The optical connector adapter with shutter according to claim 3, wherein the base plate of the shutter member includes a recess positioned between these shutter plates and recessed toward the center portion of the insertion hole.

5. The optical connector adapter with shutter according to claim 4, wherein the shutter plate has the curvature radius in a range of 5.0 to 7.5 mm.

6. The optical connector adapter with shutter according to claim 5, wherein the shutter member has a thickness dimension in a range of 0.01 to 0.1 mm and the shutter plate has an elastic/repulsive force in a range of 0.1 to 0.6 N.

* * * * *